Figure 1:
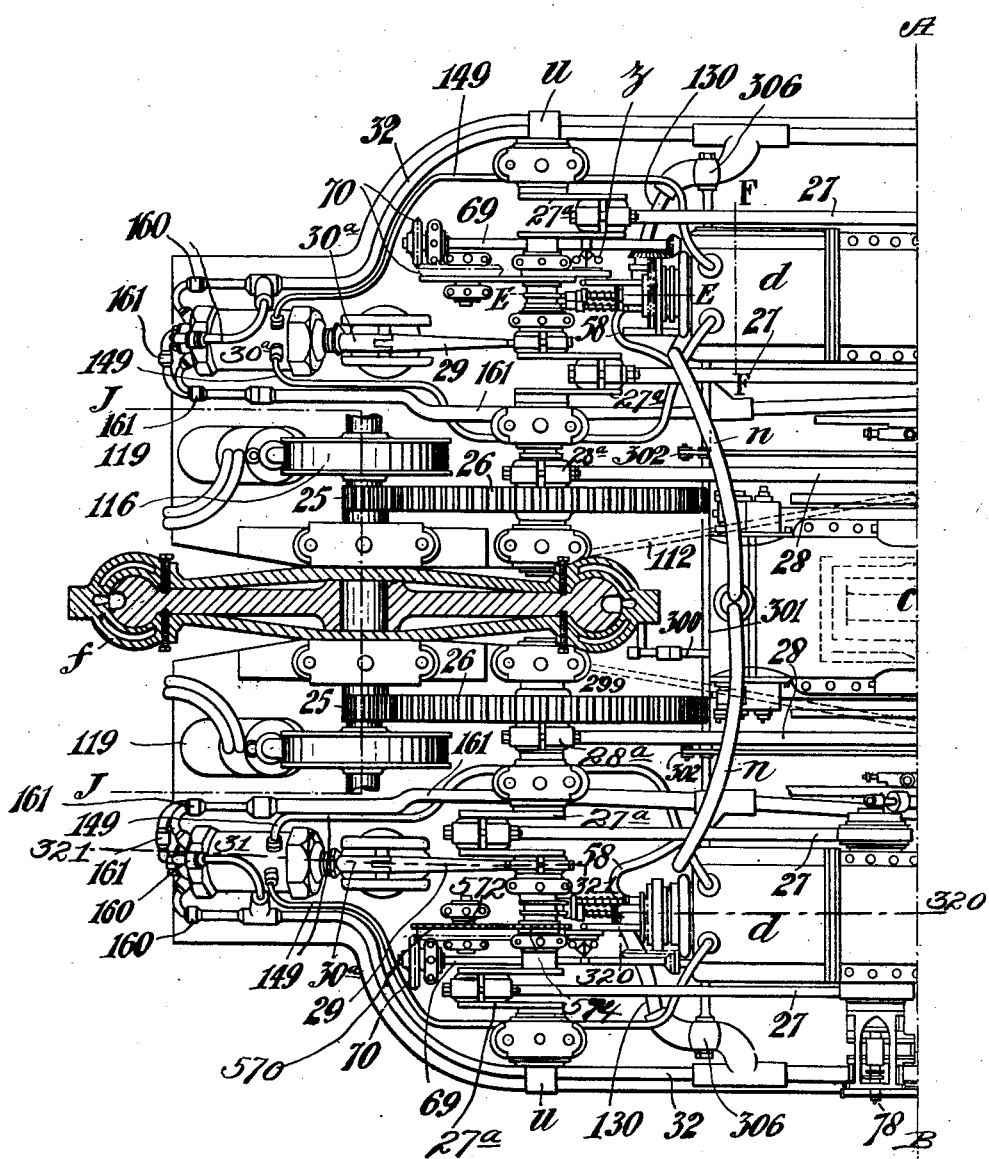

J. HUTCHINGS.
COMBINED TURBINE AND INTERNAL COMBUSTION MOTOR ENGINE.
APPLICATION FILED JAN. 22, 1907.

919,174.

Patented Apr. 20, 1909
22 SHEETS—SHEET 1.

Witnesses:

Inventor
John Hutchings
By
James L. Norris

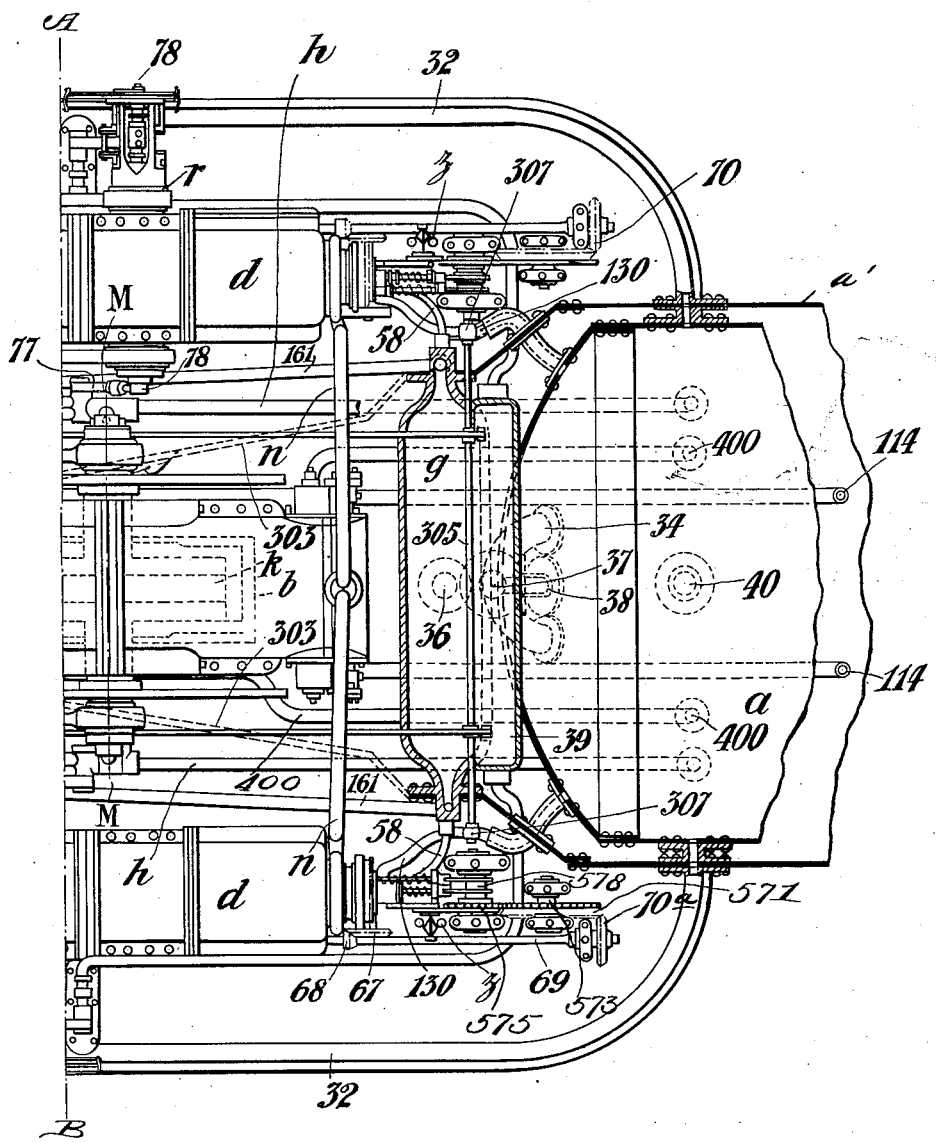

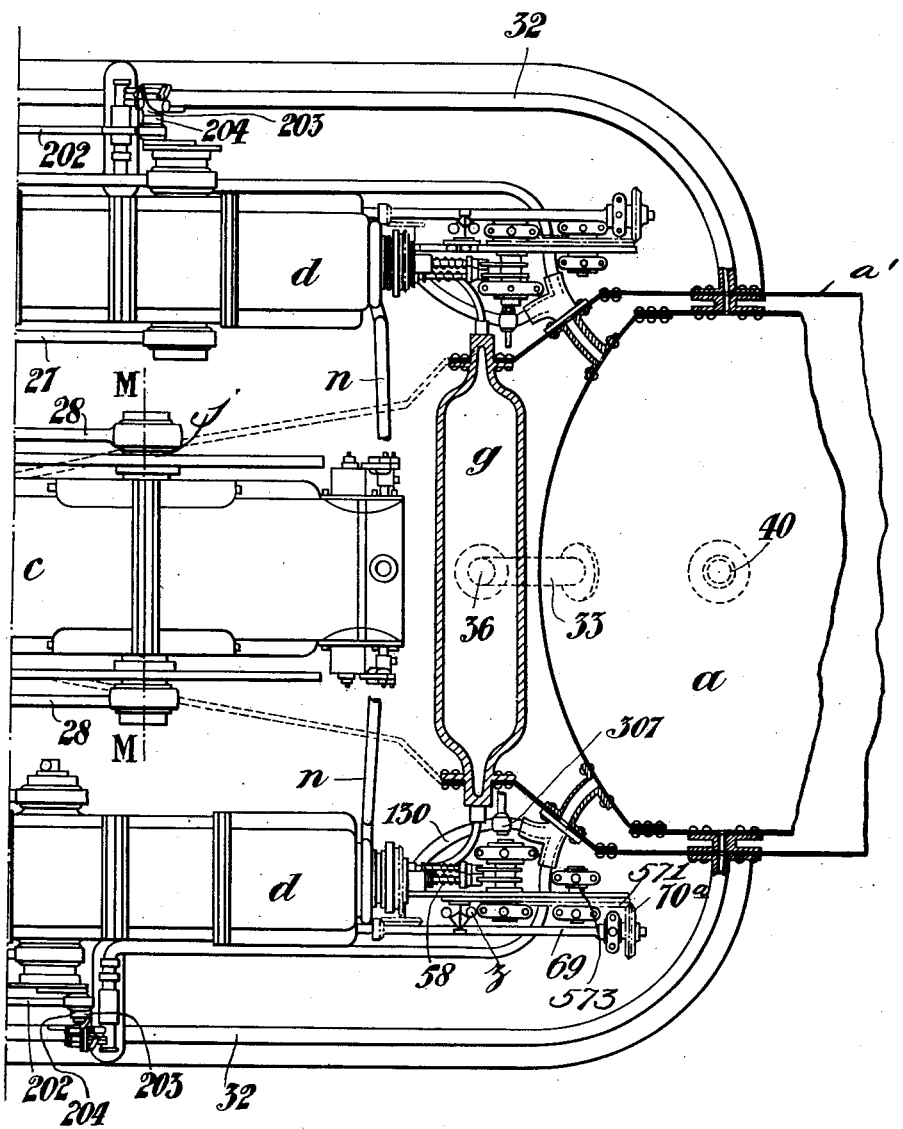

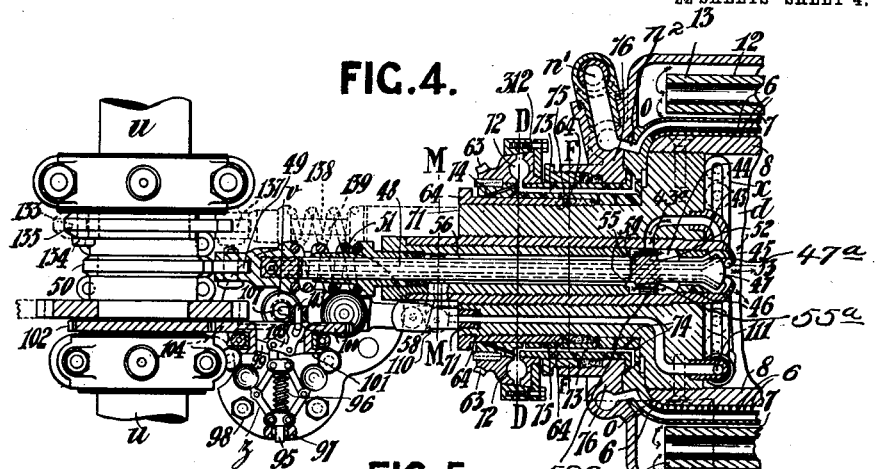

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 5.
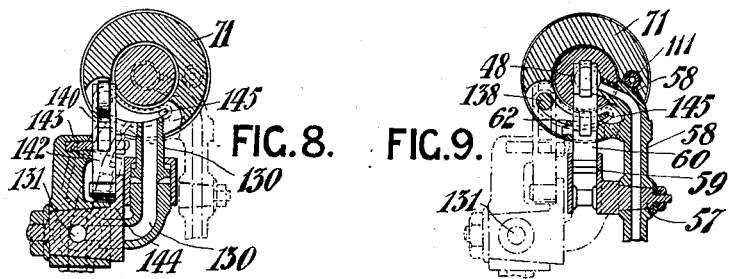
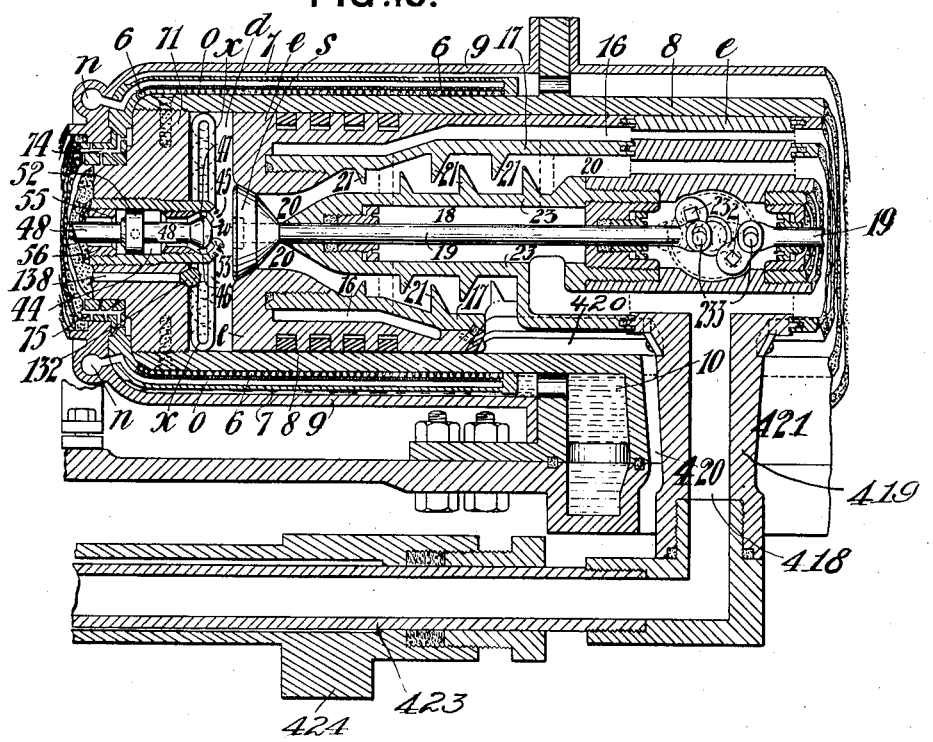
Witnesses,
Inventor
John Hutchings
By
James L. Norris
Atty J. HUTCHINGS.
COMBINED TURBINE AND INTERNAL COMBUSTION MOTOR ENGINE.
APPLICATION FILED JAN. 22, 1907.

919,174.

Patented Apr. 20, 1909.
22 SHEETS—SHEET 6.

Witnesses:

Inventor
John Hutchings
By
James L. Norris
Atty.

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 7.
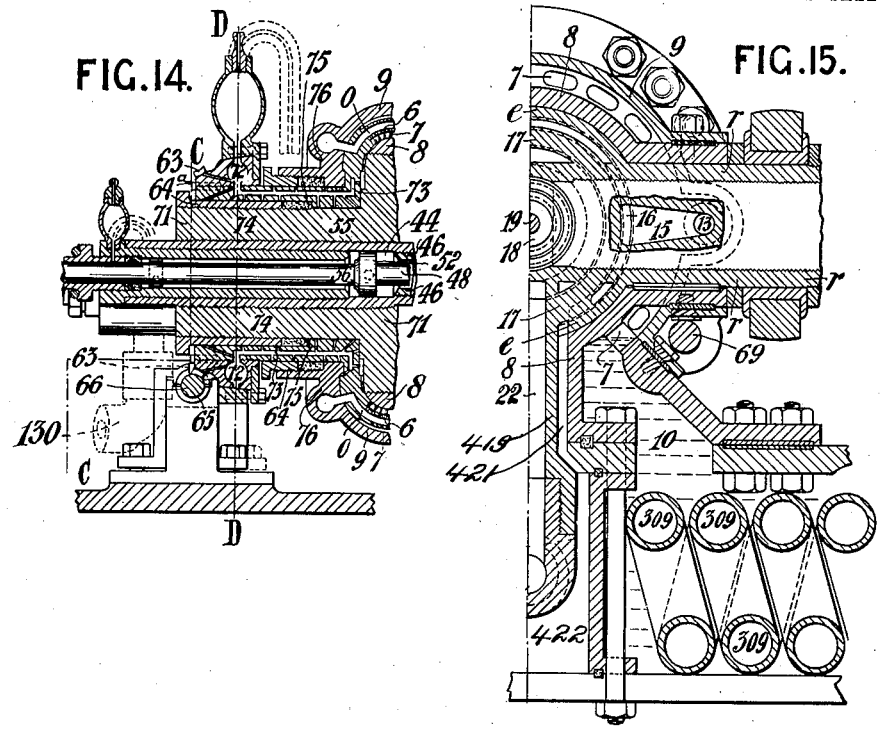
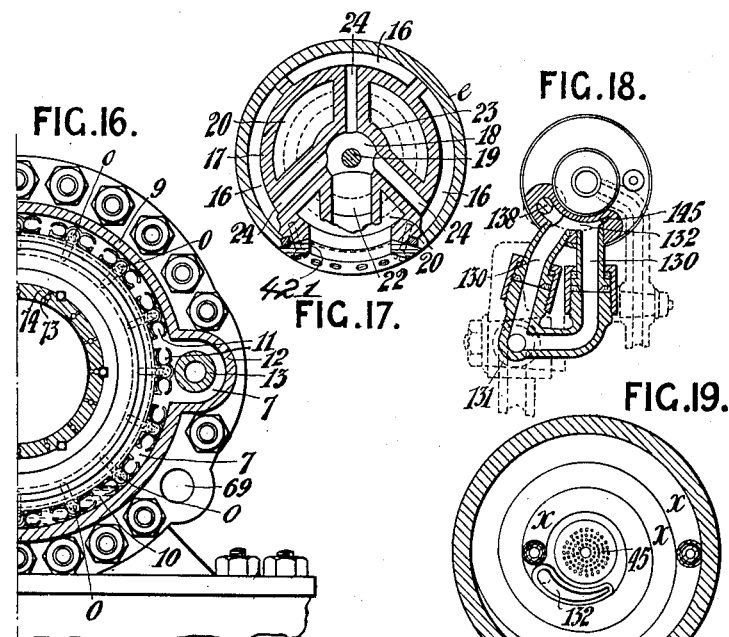
Witnesses:
Inventor
John Hutchings
By James L. Norris
Atty.

J. HUTCHINGS.
COMBINED TURBINE AND INTERNAL COMBUSTION MOTOR ENGINE.
APPLICATION FILED JAN. 22, 1907.

919,174.

Patented Apr. 20, 1909.
22 SHEETS—SHEET 8.

Witnesses:

Inventor
John Hutchings
By
James L. Norris
Atty.

J. HUTCHINGS.
COMBINED TURBINE AND INTERNAL COMBUSTION MOTOR ENGINE.
APPLICATION FILED JAN. 22, 1907.

919,174.

Patented Apr. 20, 1909.

22 SHEETS—SHEET 9.

Witnesses:

Inventor
John Hutchings
By James L. Norris
Atty.

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 10.
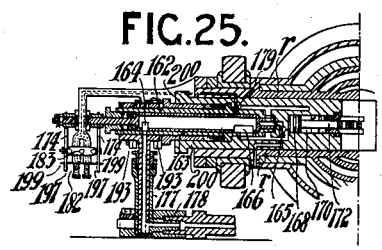
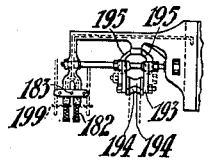
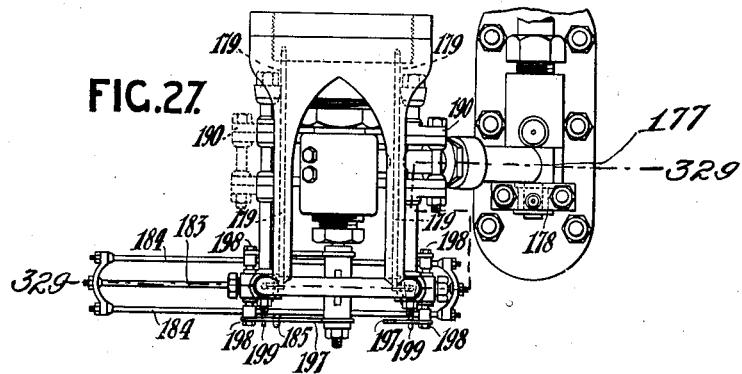

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 11.
FIG. 28.
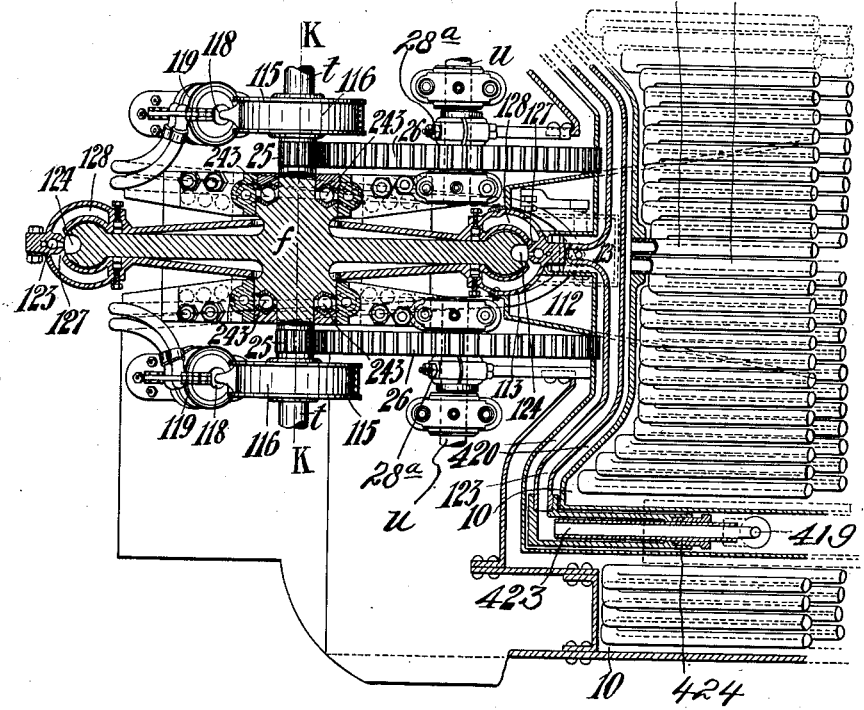
FIG. 28<sup>A</sup>.
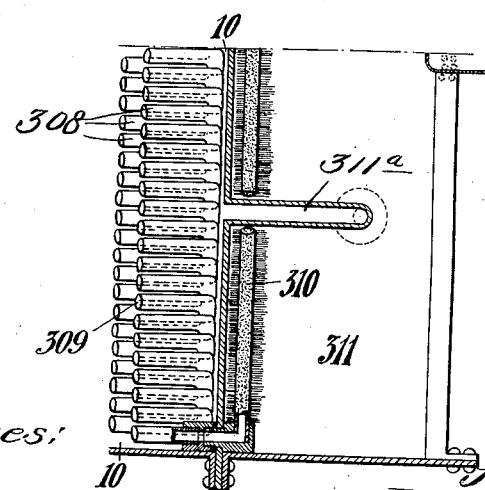
Witnesses:
Inventor
John Hutchings
By
James L. Norris
Atty.

J. HUTCHINGS.
COMBINED TURBINE AND INTERNAL COMBUSTION MOTOR ENGINE.
APPLICATION FILED JAN. 22, 1907.

919,174.

Patented Apr. 20, 1909.
22 SHEETS—SHEET 13.

Witnesses

Inventor
John Hutchings
By James L. Norris
Atty.

J. HUTCHINGS.
COMBINED TURBINE AND INTERNAL COMBUSTION MOTOR ENGINE.
APPLICATION FILED JAN. 22, 1907.

919,174.

Patented Apr. 20, 1909.
22 SHEETS—SHEET 14.

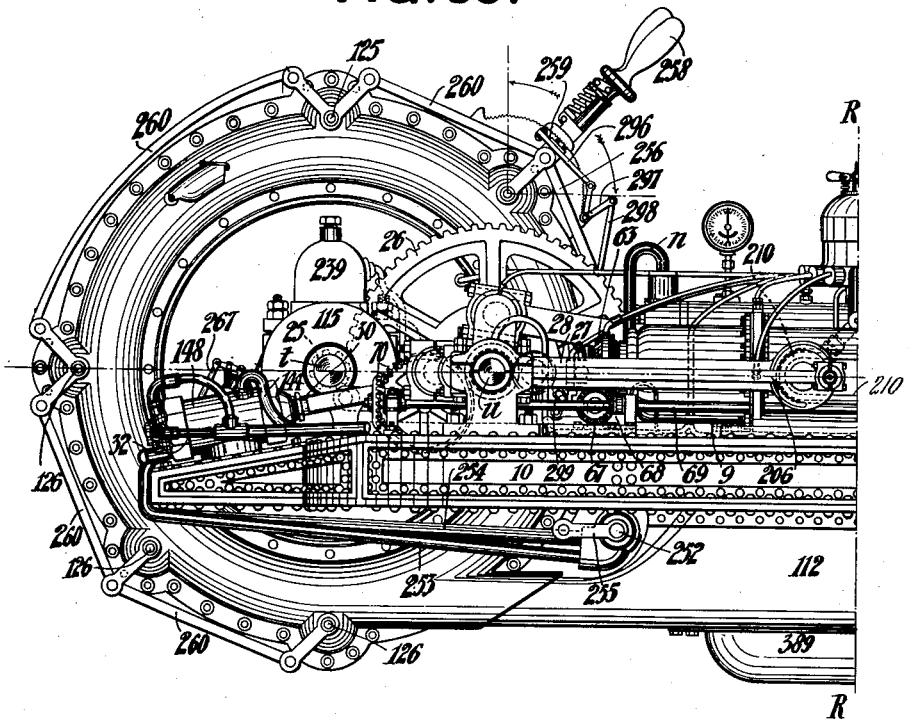

J. HUTCHINGS.
COMBINED TURBINE AND INTERNAL COMBUSTION MOTOR ENGINE.
APPLICATION FILED JAN. 22, 1907.

919,174.

Patented Apr. 20, 1909.
22 SHEETS—SHEET 16.

Witnesses

Inventor
John Hutchings

J. HUTCHINGS.
COMBINED TURBINE AND INTERNAL COMBUSTION MOTOR ENGINE.
APPLICATION FILED JAN. 22, 1907.

919,174.

Patented Apr. 20, 1909.
22 SHEETS—SHEET 17.

Witnesses:

Inventor
John Hutchings
By
James L. Norris.
Atty.

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 18.
FIG. 43. 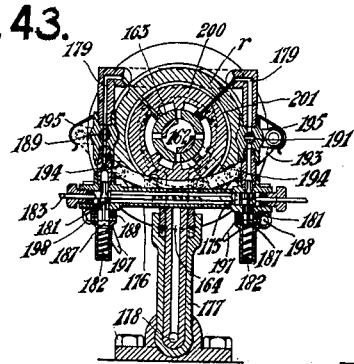 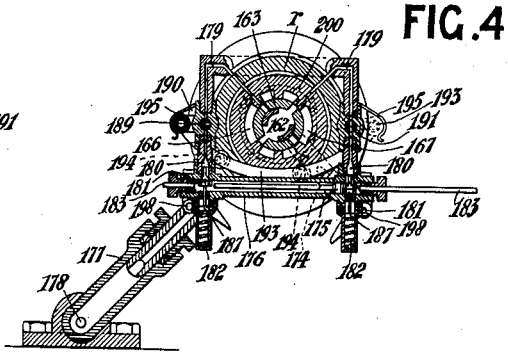 FIG. 44.
FIG. 45. 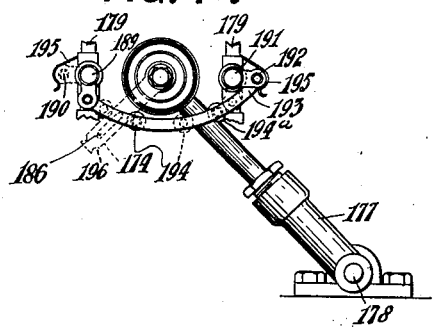 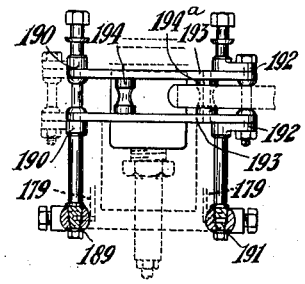 FIG. 46.
FIG. 47. 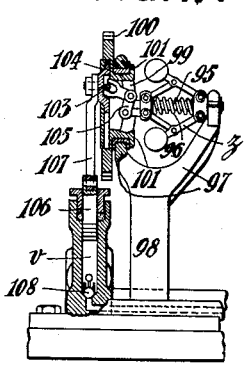 FIG. 48. 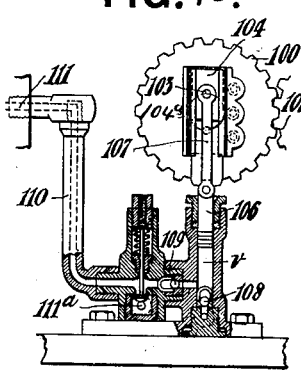 FIG. 49. 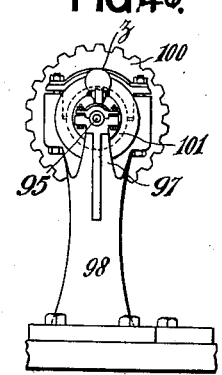
Witnesses:
Inventor
John Hutchings
By
James L. Norris
Atty.

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 19.
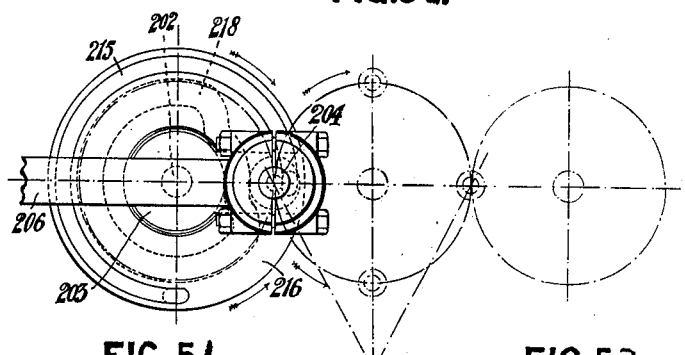
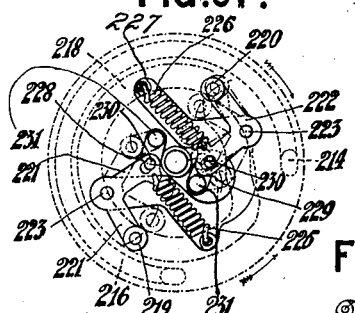
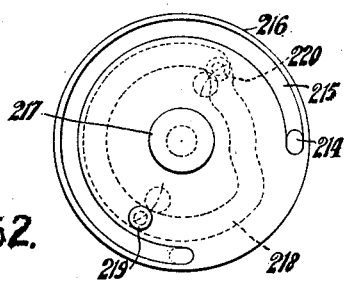
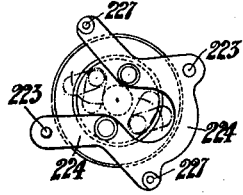
Witnesses:
Inventor
John Hutchings
By
James L. Norris.
Atty.

J. HUTCHINGS.
COMBINED TURBINE AND INTERNAL COMBUSTION MOTOR ENGINE.
APPLICATION FILED JAN. 22, 1907.
919,174.
Patented Apr. 20, 1909.
22 SHEETS—SHEET 20.
FIG. 54.
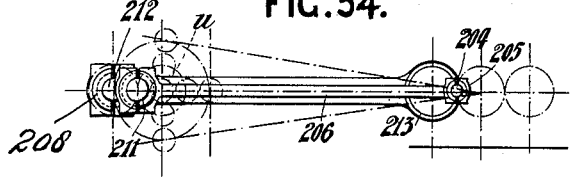
FIG. 55
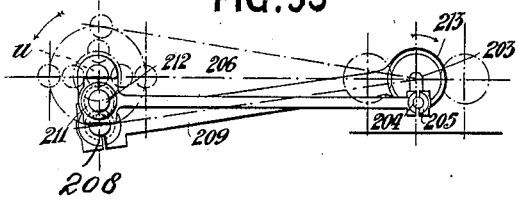
FIG. 56.
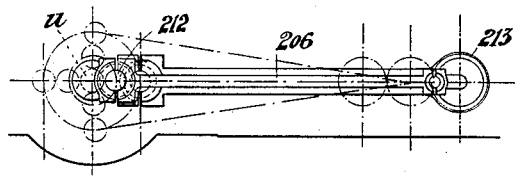
FIG. 57.
FIG. 58.
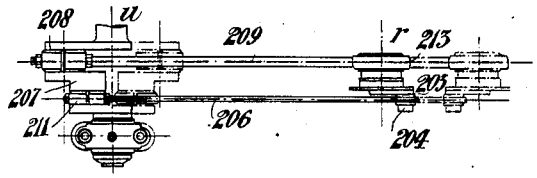
Witnesses:
Inventor
John Hutchings
by
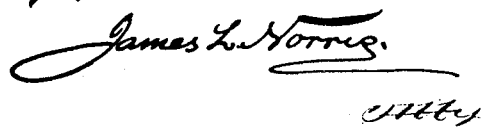
Atty.

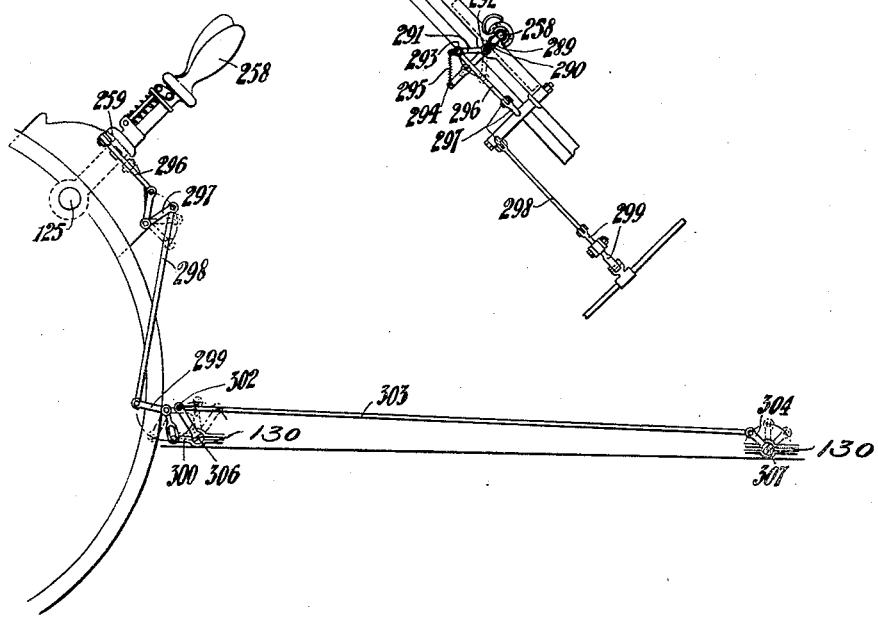
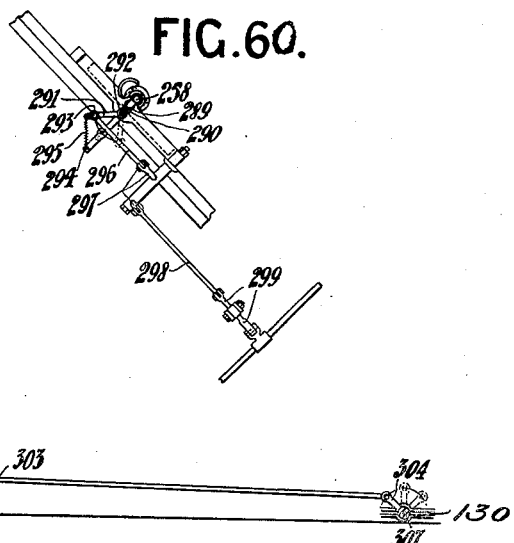
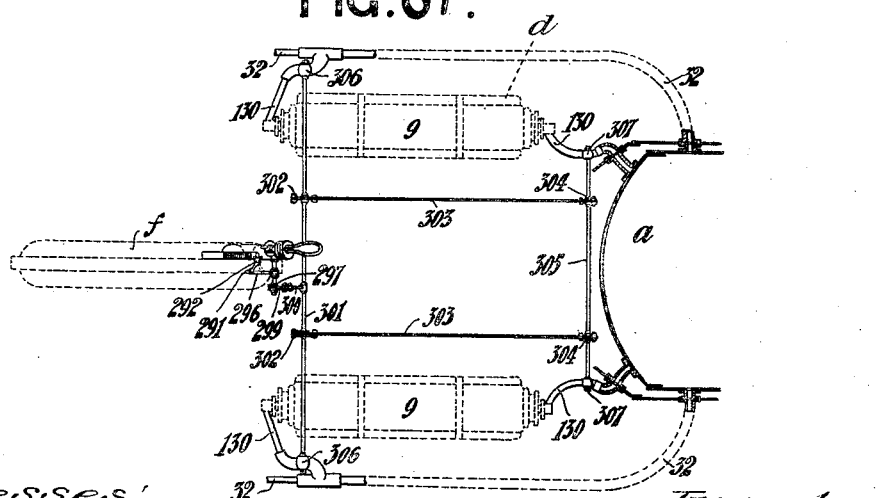

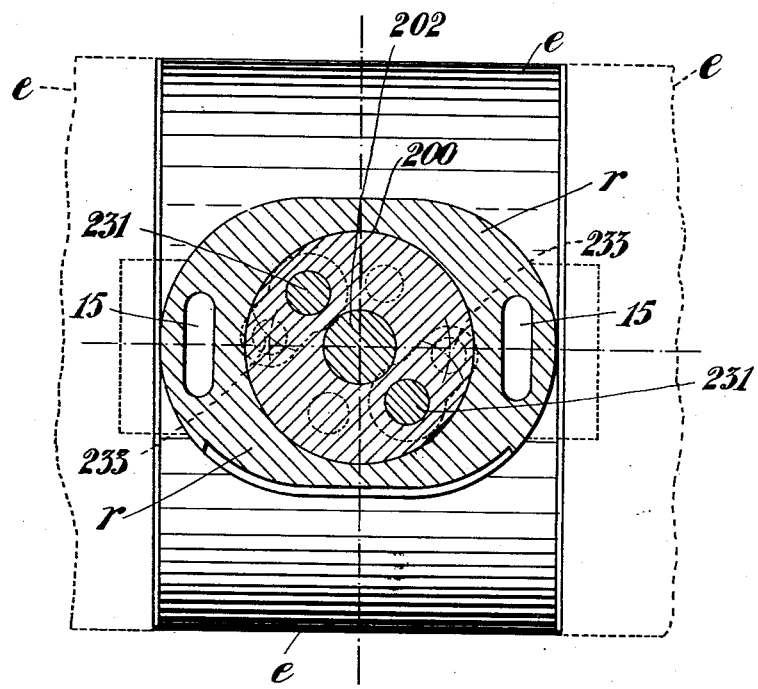

UNITED STATES PATENT OFFICE.

JOHN HUTCHINGS, OF MOORFIELDS, LONDON, ENGLAND.

COMBINED TURBINE AND INTERNAL-COMBUSTION MOTOR-ENGINE.

No. 919,174.  Specification of Letters Patent.  Patented April 20, 1909.

Application filed January 22, 1907. Serial No. 353,485.

*To all whom it may concern:*

Be it known that I, JOHN HUTCHINGS, a subject of the King of Great Britain, residing at 210 Moorgate Station Chambers, Moorfields, in the city of London, England, mechanical and mining engineer, have invented certain new and useful Improvements in and Relating to a Combined Turbine and Internal-Combustion Motor-Engine, of which the following is a specification.

My present invention relates to improvements in internal combustion engines, and has for its object primarily to provide an engine of this character acting as a primary motor in combination with a fluid compressor, which is driven by the primary motor and is capable of supplying motive fluid for driving an auxiliary motor, the latter being operatively connected to and serving to supplement the power of the primary motor, the heat from the explosions within the power cylinders of the primary motor, and that generated by the compressor being utilized to expand the motive fluid, and means being provided for supplying a suitable liquid to the motive fluid, that not only serves to assist cooling of the engine and compressor cylinders, but also increases the heat absorbing expansive properties of the motive fluid, so that a maximum volume and pressure thereof is attained for the driving of the auxiliary motor.

Another object of the invention is to employ a turbine as an auxiliary motor, the revoluble element of which serves as a fly wheel for an internal combustion engine which is employed as the primary motor, the turbine being connected to operate at a high speed relative to that of the primary motor so that a turbine of relatively small size is capable of performing its function, and the turbine is adapted to operate with fluid at a moderate pressure.

Further objects of the invention are to provide an improved cooling arrangement for the cylinders of the internal combustion engine which performs the additional function of forming a part of the heating and expanding apparatus for the motive fluid of the auxiliary motor; also to provide a regulating device for governing the supply of liquid which is utilized to perform the dual function of cooling the cylinders of the internal combustion engine and to amplify the heat absorbing and expansive properties of the motor fluid.

To these and other ends, the invention consists in certain improvements, and combinations and arrangements of parts, all as will be hereinafter more fully described, the novel features being pointed out particularly in the claims at the end of the specification.

Figure 11:
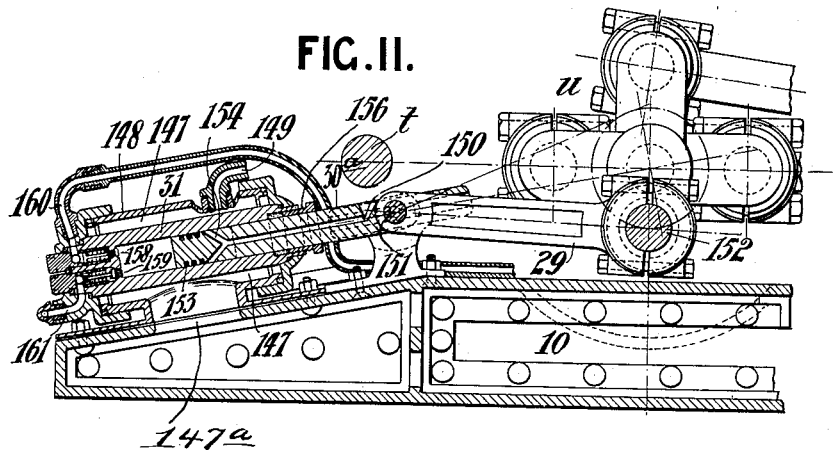
Figure 12:
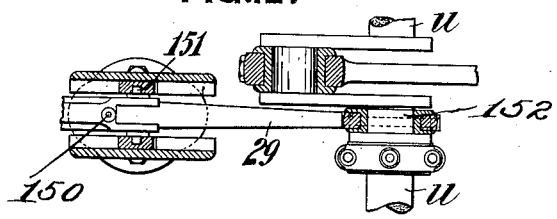
Figure 13:
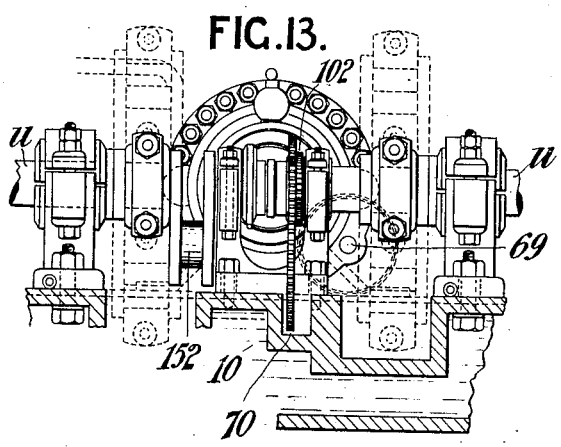
Figure 20:
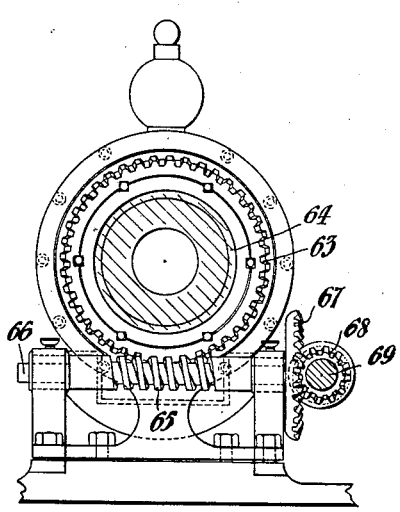
Figure 21:
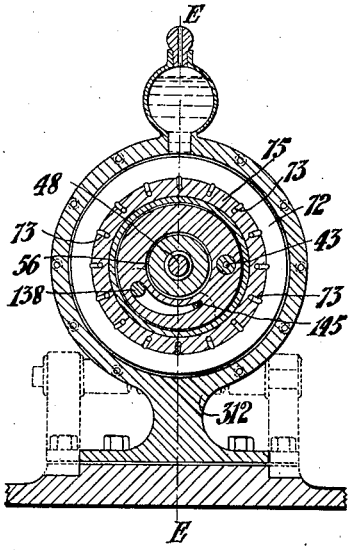
Figure 22:
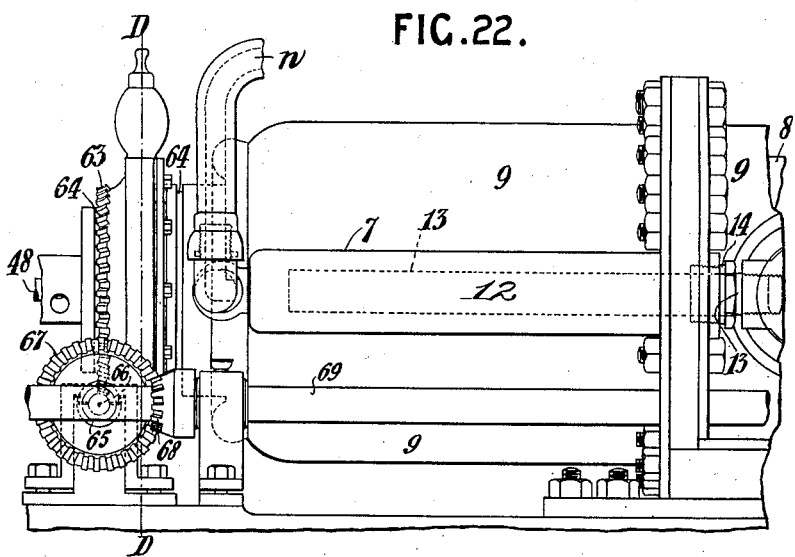
Figure 23:
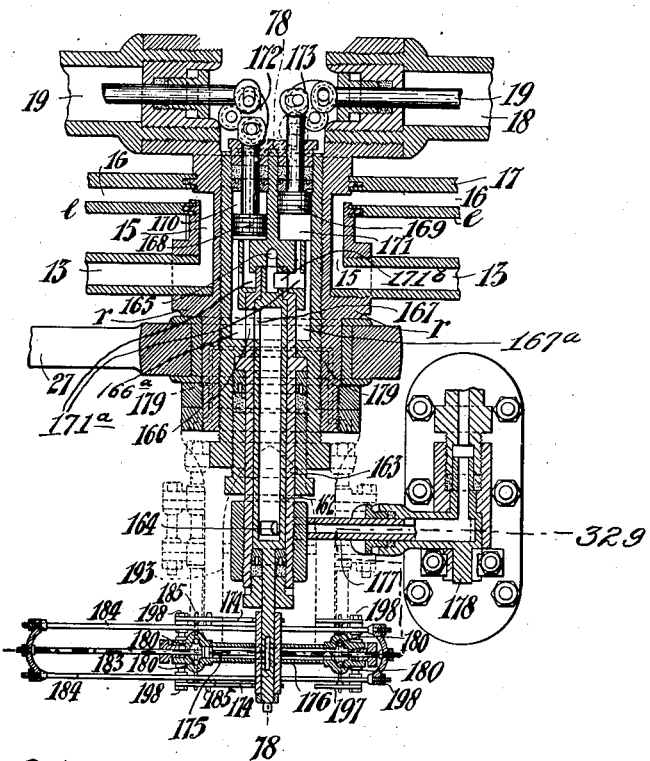
Figure 24:
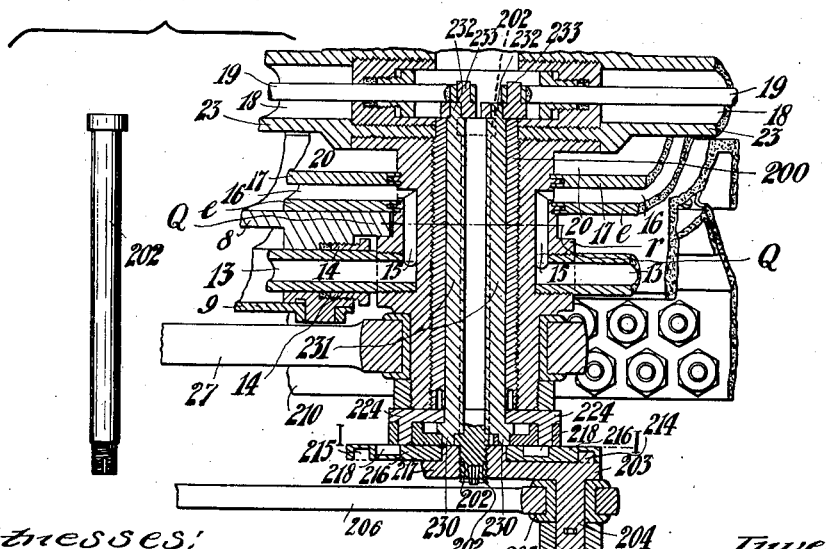
Figure 29:
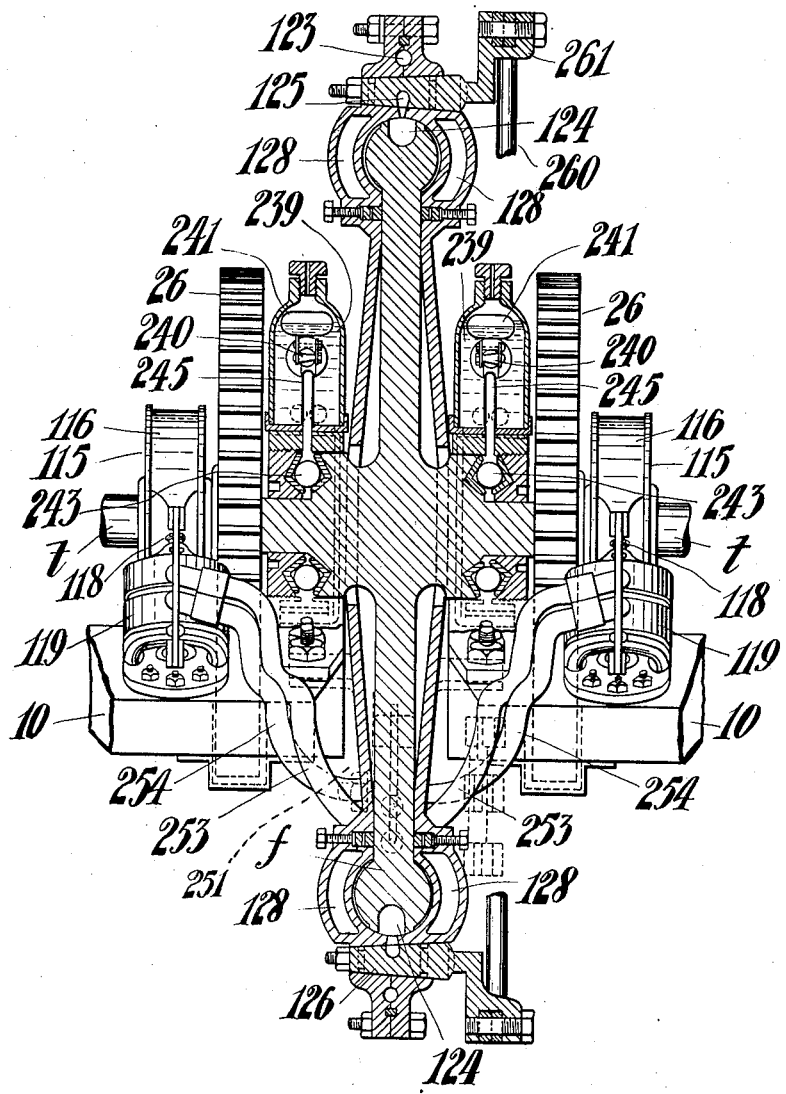
Figure 30:
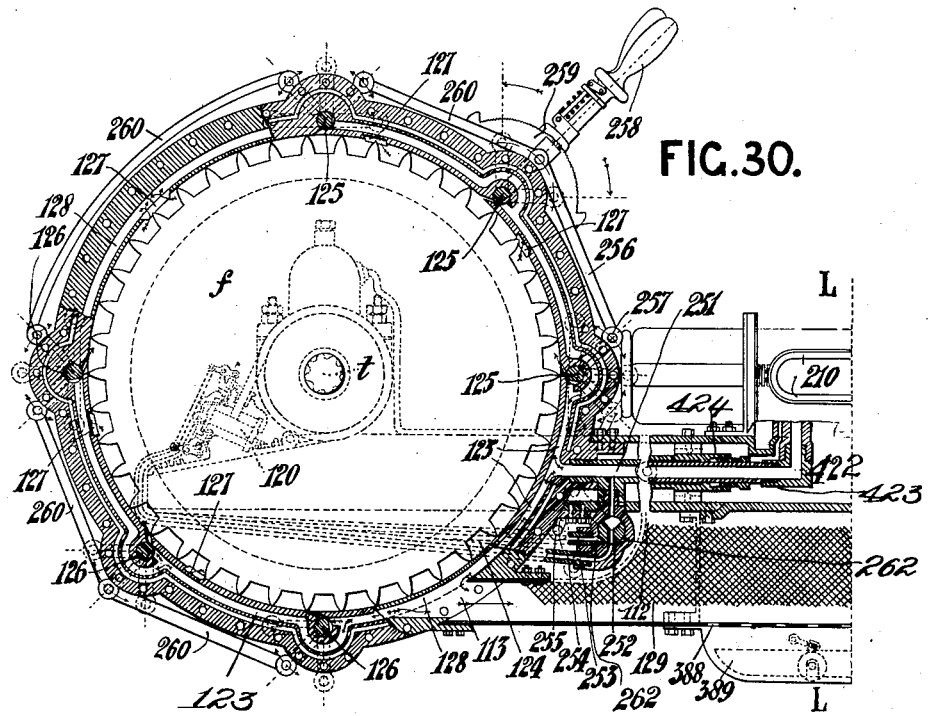
Figure 31:
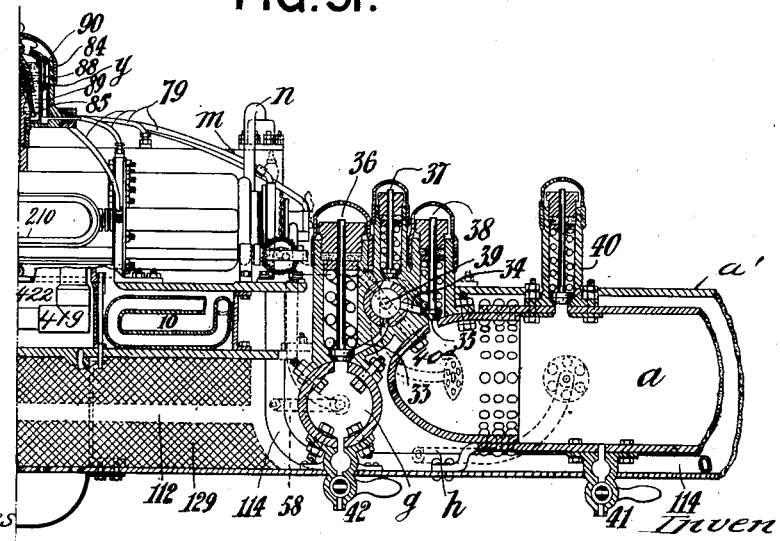
Figure 32:
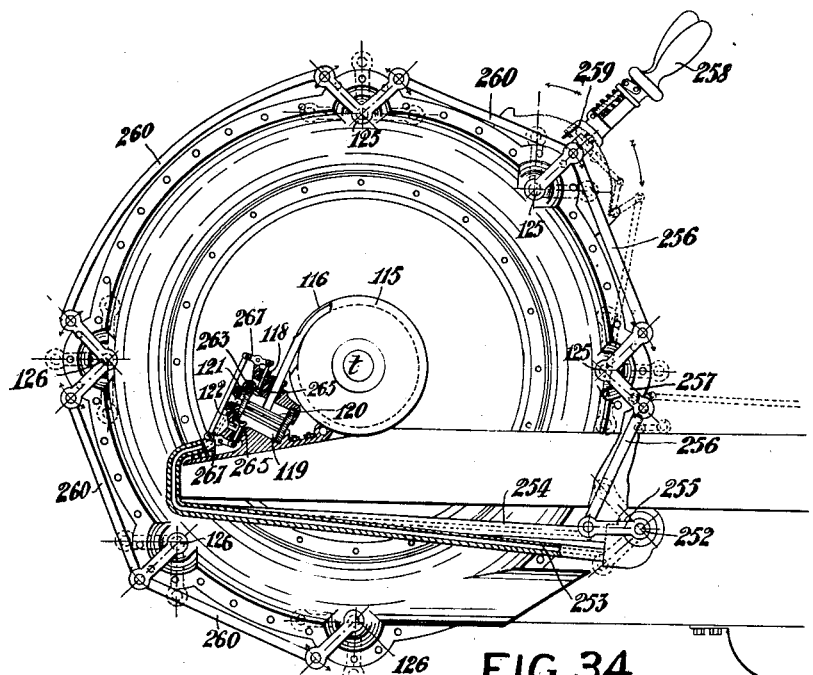
Figure 34:
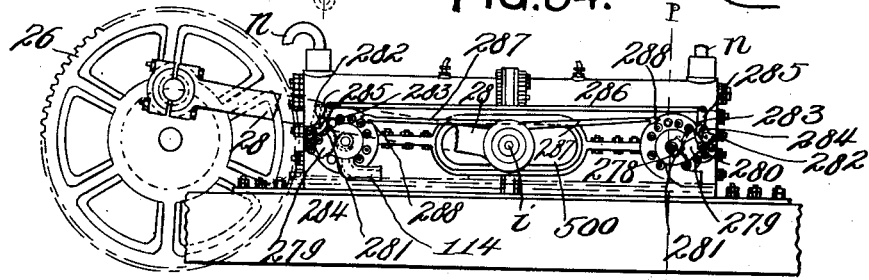
Figure 35:
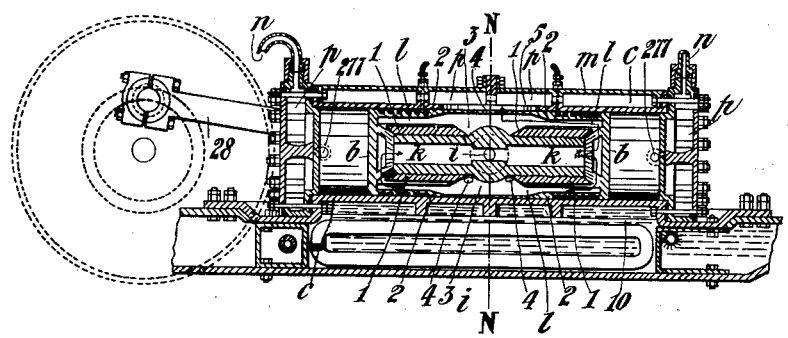
Figure 36:
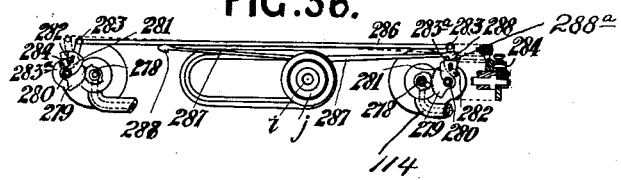
Figure 37:
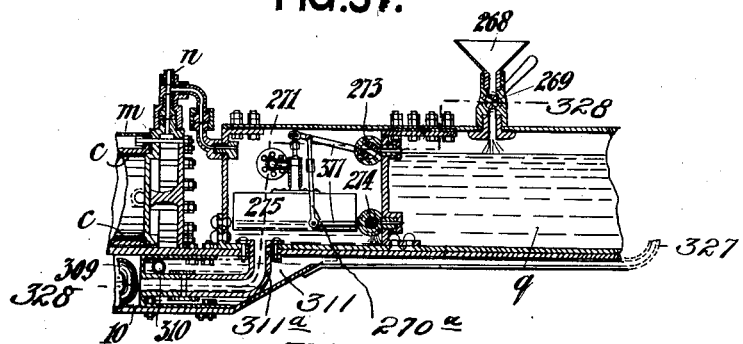
Figure 38:
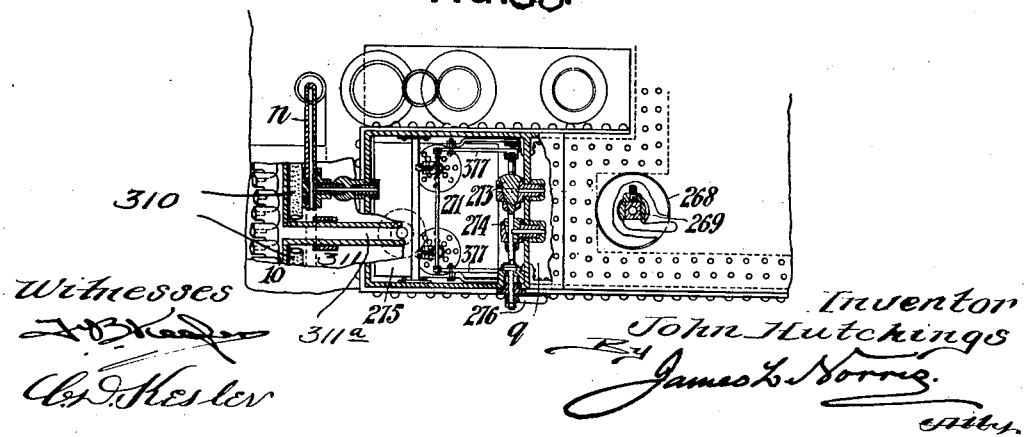
Figure 39:
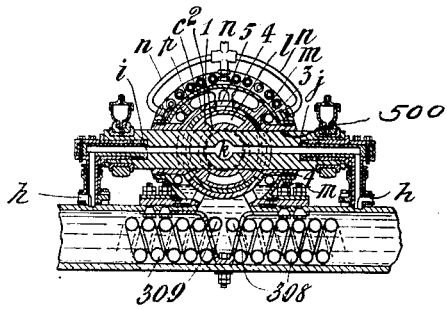
Figure 40:
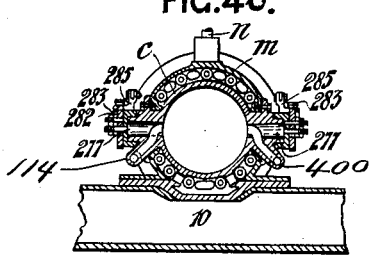
Figure 41:
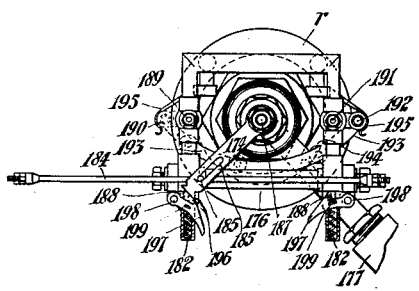
Figure 42:
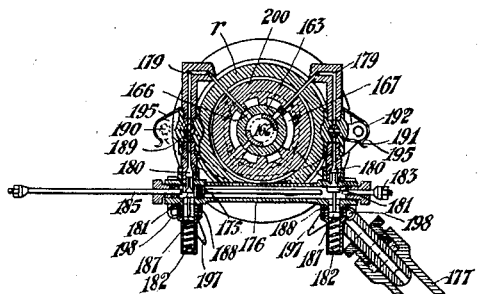

In the accompanying drawings:—Figures 1 and 2 are general plan views of the right and left hand ends of an engine constructed in accordance with my present invention, divided for convenience of the drawing on the line A—A; parts being in section; Fig. 3 is a plan view, similar to Fig. 2, certain parts of the mechanism for operating the valves being modified to enable the valve to be mechanically instead of pneumatically actuated, details of which mechanism are more clearly to be seen in Fig. 24 and other of the figures as hereinafter explained, the reservoirs *a* and *g*, being in section; Fig. 4 is a horizontal section of parts to a much larger scale, being the left hand lower end of one of the explosion chambers as seen in Fig. 1 and parts adjacent; Fig. 5 is a detail to the same scale showing the cam section for operating the valves regulating the supply of hydro-carbon and high pressure air to feed combustion with a portion of the pipe 58 in vertical section; Fig. 6 shows a central vertical section taken on the line 6—6, Fig. 7, of the cam for operating and the valve parts operated thereby for controlling the scavenging or expelling the after products of combustion in chambers *d;* Fig. 7 is a plan of the parts seen in Fig. 6 with the walls of passages in section, taken on the line 7—7, Fig. 6; Fig. 8 is a cross section of Fig. 6 on the line G, G thereof; Fig. 9 is a cross section of parts shown in Figs. 4 and 5, taken on the line M, M, of those figures; Fig. 10 shows in vertical section taken on the line 320, Fig. 1, an explosion chamber *d* when the piston *e* is fully forward in full compression and parts to the left hand thereof, regarding Fig. 1; Fig. 11 shows in vertical section taken on the line 321 Fig. 1, one of the high pressure air-pumps, the crank shaft and its pins, as well as the crank rod working this pump; Fig. 12 is a plan view of the cranks and connecting rods shown by Fig. 11, with certain parts in section; Fig. 13 is an end elevation of the divided crank shaft seen at the left hand lower portion of Fig. 1 and looking toward the right hand; Fig. 14 is a vertical section showing the lubricating channels 72, and high pressure air passages taken on the line E, E, Figs. 1 and 21; Fig. 15 is a vertical half cross section showing the right hand half of the water tubes 309 and an adjacent water chamber 10 as well as one of the air distribution passages 15 connecting one of the said water chambers 7 with one of the piston chambers 16; Fig. 16 is a cross section of one half only of the left hand end of parts shown in Fig. 4, and taken on the line F, F thereof; Fig. 17 is a section through the central space 18 showing the radial passages 24 of the pistons e; Fig. 18 is a cross section taken on the line G G, Fig. 6, of the air scavenging inlet passages partly seen in Fig. 8; Fig. 19 is a sectional end view showing the helical coil and inlets for motive fluid to one of the chambers d, also the rose ended deflector 45 and the opening 132 in the seat of the scavenging valve; Fig. 20 is an end view of the worm 65 and bevel gears for actuating the air and water distribution pipes, o with parts in section taken on the line C, C, Fig. 14; Fig. 21 is a vertical section taken on the line D, D, Figs. 14 and 22; Fig. 22 is an external side view of Fig. 10; Fig. 23 is a horizontal section of the lower end, regarding Fig. 1, of the pneumatically actuated exhaust valves and adjacent parts; Fig. 24 is a sectional plan view similar to the preceding figure showing the mechanism for controlling the motion of the mechanically actuated exhaust valves located in the face of the piston e; with the pin 202 shown separately alongside; Fig. 25 is a vertical longitudinal section taken through the axial bar at right angles to Fig. 23, and shows the pneumatic device for operating the valve s; Fig. 26 is an external side view of the left hand end portion of Fig. 25, showing the parts actuating valves 162—163; Fig. 27 is a plan view of parts shown by Figs. 25 and 26; Figs 28 and 28ª show a section plan view of the turbine f, the turbine motive-fluid pipes 123 and the exhaust and water heating pipes 308 and 310; portions of the casing being removed for the convenience of the drawing the lower Fig. 28ª showing the right hand ends of the lower halves of the pipes 309; Fig. 29 shows a vertical section of certain parts shown in Fig. 28 taken on the lines J, J, Fig. 1, and K, K, Fig. 28; Figs. 30 and 31 show two halves of a longitudinal vertical section of the turbine wheel and the passages of supply and other parts, the figures being divided on the line L, L; Fig. 32 shows a section of the turbine brake mechanism at one side of the turbine wheel and means for actuating the same; Figs. 33 and 33ª are respectively the right and left hand portions in side elevation of the engine assembled, divided on the line R, R; Fig. 34 is a front elevation of the low pressure pump apparatus or main air compressor; Fig. 35 is a vertical longitudinal section of Fig. 34; Fig. 36 is a detail showing the valve gear of the main air compressor illustrated in Fig. 34; Fig. 37 shows a vertical longitudinal section of the water supply reservoir valve controlled apparatus and connecting passages; Fig 38 is a sectional longitudinal plan view of Fig. 37, taken on the line 328, Fig 37; Fig 39 is a transverse sectional elevation of the main or low pressure compressor taken on the line M, M of Fig 3 and N, N Fig. 35; Fig. 40 is a transverse section taken on the line P, P Fig 34; Fig 41 is an external end view of the four way valve shown in section in Figs 42, 43 and 44; Figs 42, 43 and 44 show a four-way valve apparatus in duplicate in section, the sections being taken on line 329, Figs 23 and 27, in three separate positions; Fig. 45 is an end elevation showing a separate detail view of the connecting strap 193 and cross bars 194 with anti-friction rollers and hollow telescopic air supply valve rock shaft 177, for actuating the valves 189—191; Fig. 46 is an inverted plan view of the upper part of Fig. 45; Fig. 47 is a section of the motive fluid supply pump and governor apparatus separately, with the parts arranged in a position at right angles to that indicated in Figs. 1 and 4; Fig. 48 shows some of the same parts as in Fig. 47 partly in section and at right angles thereto but with the actuating gear wheel 102 on the main shaft only partially indicated and showing the relief-valve 111ª and supply pipe 110; Fig. 49 is an end view looking toward the left hand regarding Fig. 47; Fig. 50 is a diagrammatic representation of the disk 216, the connection of the crank pin 204 (also seen in Fig. 24) between the said plate and the secondary crank rod 206 and showing the path described by the center pin 202 of said crank in the reversing movement; Fig. 51 shows a face view of the levers in rear of the sectional line I, I, Fig. 24 showing the cam grooves 215—218 and plate 216 in dotted lines; Fig. 52 shows the bracket or support located in rear of the parts shown by Fig. 51 for the pins 223, and springs 225; Fig. 53 shows the cam plate face; Figs. 54, 55, 56 and 57 show diagrammatically the four respective positions during a cycle of the main and secondary cranks 209 and 206 in four positions; Fig. 58 is a plan view of the parts seen in side view Fig. 54 in full lines and as seen in Fig. 56 in dotted lines; Fig. 59 is a longitudinal detail view of the levers and actuating means for governing the inlet of air for scavenging the chambers d, during working and for cutting off supply as soon as the engine stops; Fig. 60 is a plan view of the preceding figure; Fig. 61 is an end view, looking in a downward direction, of the front portion of Fig. 59; Fig. 62 shows by a cross section taken on the line Q, Q of Fig. 24 the relative positions of the two rods 231, the center pin 202 and the air passages 15.

Similar parts are designated by the same reference characters in the several figures.

The apparatus shown in the present embodiment of my invention, comprises generally a suitable base having one or more internal combustion engines $d$ mounted in parallel relation thereon, the reciprocating pistons $e$ thereof being operatively connected to the power shafts $u$, those shown in the present instance being arranged in alinement, and disconnected at their inner ends in order to accommodate the turbine between them, a pair of connecting rods 27 attached to the respective pistons and coöperating with the cranks $27^a$ on the respective shafts $u$, whereby the reciprocating movements of the pistons are converted into rotary motion. Between the cylinders of the internal combustion engines is mounted an air compressor $c$ which serves to supply motive fluid under pressure to the turbine after the fluid has traversed those parts which serve to expand it. A double acting piston $b$ is mounted to operate within the compressor cylinder, as shown in Fig. 35, and the piston is provided with oppositely extending trunnions $j$ which project through openings in the opposite sides of the compressor cylinder and are connected to the two shafts $u$ by means of the connecting rods 28 to operate with crank or eccentrics $28^a$ on the respective shafts. The latter are connected to one another by the turbine shaft $t$, and are provided with a pair of relatively small pinions 25 which coöperate with a pair of gears 26 secured on the approximate ends of the two power shafts $u$.

The internal combustion engines composing the primary motor are substantially duplicates in the present instance, and they each embody a cylinder 8 which is closed at its opposite ends to form a pair of oppositely arranged combustion chambers, the pistons $g$ being provided with oppositely arranged heads to operate within the respective combustion chambers $d$, a pair of trunnions $r$ projecting radially in opposite directions through openings in the opposite walls of the cylinder receiving the connecting rods 27 attached to the power shaft. Mounted in the end of each piston head is an exhaust valve $s$ which is connected to the operating stem 19 and which controls the discharge of the spent gases from the combustion chamber $d$ into the passages 20 extending longitudinally through the piston and discharging at the under side thereof through an opening 420, the latter being arranged to register with an opening 421 extending through the under side of the cylinder casing, and the opening 421 in turn discharging into a conduit 422 arranged in the base. If so desired, a series of annular flanges or ribs 21 may be formed on the walls of the passage 20, forming a tortuous passage which will produce sufficient friction on the exhaust gases as to assist in the propulsion of the pistons, when the exhaust valve $s$ is opened while the piston is on its power stroke. An annular chamber 16 is formed in the piston to surround the exhaust passage 20 which is connected in a manner to be hereinafter described with the motive fluid of the turbine, the fluid within this chamber serving to cool the walls of the piston and to take up the heat thereof, and the heat thus taken up is utilized to expand the motive fluid. The chamber 16 communicates with a central chamber 18 within the piston by means of the radial passages 24, as shown in Fig. 17, the central chamber 18 being arranged within the exhaust passage 20 and it discharges into a passage 418 formed in a depending arm 419, the latter being rigidly attached to the piston and projecting through the opening 421 in the cylinder casing, as shown in Fig. 10. The outer end of the arm 419 is provided with an elbow 422 having a tubular extension 423 thereon which operates through a stuffing box attached to a casing 424, the latter discharging into a passage 251 leading to the turbine and its controlling devices, the stuffing box permitting reciprocatory movements of the tubular extension 423 during the operation of the piston, as shown in Fig. 30.

The outer passage 16 formed in the piston to receive the motive fluid communicates with a longitudinal passage 15, one of the latter being formed at each side of the trunnion $r$ of the piston, and into this trunnion are fitted telescopic tubes 13, two tubes being provided for each piston head and extending through a stuffing box 14, as shown in Figs. 4 and 22 into a longitudinal enlargement 12 formed in one side of the casing 9, which surrounds the cylinder casing and forms a fluid chamber between it and the cylinder wall, the ends of the tubes 13 being open to receive fluid from the said chamber, and the stuffing box permits the tube to reciprocate without leakage during the operation of the piston.

The compressor provides a source of fluid supply from which the motive fluid for the turbine is forced into the fluid chambers surrounding the engine cylinders into the tubes 13 and from the latter into the outer chambers 16 into the piston, the fluid then passing through the radial passages 24 in Fig. 17 to the central chamber or passage 18 of the piston, as shown in Fig. 10, and from the latter through the passage 418 in the arm 419, and from the latter into the tubular extension 423 which finally discharges at the turbine. The cylinder $c$ of the compressor shown in the present instance, is provided with a compression chamber at each end thereof to receive a pair of oppositely arranged heads on the piston the latter being provided with a pair of radially extending trunnions $j$ which project in opposite directions through openings 500 formed in the opposite walls of the cylinder, the trunnions being formed hollow to provide a pair of passages $i$ to receive fluid from a pair of pipes $h$ leading from a low pressure supply tank $a$, that will be hereinafter more fully described. The passages $i$ of the compressor trunnions communicate with a pair of oppositely extending axial passages $k$, as shown in Fig. 35, and these passages $k$ communicate with the annular return passages $l$ leading to enlarged centrally arranged chambers 3, the fluid collected within the chamber 3 discharging through openings 4 formed in the walls of the piston 2 and registering apertures 5 in the cylinder wall, and into the space $p$ surrounding the compressor chamber 3, the space $p$ around the compressor cylinder communicating in turn with a water tank 10 formed in the base, as shown in Figs. 39 and 40, the casing $m$ surrounding the space $p$ and providing a jacket for the compressor cylinder. The fluid within the jacket thus formed is discharged therefrom through the conducting pipes $n$, as shown in Figs. 35, 39 and 40, the pipes $n$ leading to the annular channels $n'$ which discharge into the fluid chambers surrounding the cylinders within the casing 9, as shown in Fig. 4. The fluid to be compressed is admitted to the compression chambers of the compressor through the valves 277, as shown in Figs. 3 and 40, plug valves being shown in the present instance which have portions projecting from the opposite sides of the compressor cylinder and are provided with gear segments 278, the latter in turn coöperating with gear sectors 279 mounted on pivots 280, and the sector 279 is rotated alternately in opposite directions by means of a plate 281 which is journaled on the pivot 280 and is provided with an approximately radial slot 282 to receive a laterally projecting pin 284 carried by an operating arm 283, the latter being pivoted to the said plate at 283$^a$, and the arms 283 for operating the inlet valves at the opposite ends of the compressor are connected for simultaneous movement by a rod 286. These operating arms for the respective intake valves are rotated alternately in opposite directions to admit charges of air to the opposite ends of the cylinder by means of a pair of latches 287 which are carried by the trunnions of the compressor piston and are provided at their free ends with latch-shaped projections 288 adapted to freely enter the notches 288$^a$ formed in the arms 283, as shown in Fig. 36, a reverse motion of the arms 287 causing the latch-shaped portion on one of them to engage the said recess and turn the corresponding valve 277 into a position to admit air from the supply pipe 114, and simultaneously rotating the valve at the opposite end of the compressor to interrupt the admission of air from the supply pipe 114 and to permit the compressed air within the corresponding compression chamber to discharge into the pipe 400 which leads to the storage tank $a$. However, the valve mechanism just described is not essential and it will be understood that valves of a different character may be substituted for those shown, if so desired.

The storage tank $a$ to which the compressor delivers compressed air may be of any suitable construction, and in the present instance it is surrounded by a shell $a'$, the space thus formed between the tank and the shell serving as a cooling jacket into which the fluid at a low temperature is discharged from the turbine, as will be hereinafter more fully described, the pipes 114 which supply the air to the compressor being preferably so connected as to receive their charges of fluid from the said chamber.

The annular channels $n'$ receive the fluid after it has traversed the compressor piston and cylinder jacket through the conducting pipes $n$, as shown in Figs. 1, 10 and 22, each channel being formed in a reduced portion 76 of the casing 9 which surrounds the engine cylinder, and communicates through passages $n^2$ with the bores of a plurality of pipes $o$ which are arranged in an annular row surrounding the cylinder wall and are carried by a journal sleeve 75, the latter in turn revolubly fitting the reduced extension 76 of the cylinder casing and is packed by a stuffing box gland 64. The inner sides of the pipes $o$ are provided each with a plurality of inwardly directed discharge orifices 6 through which the fluid conducted from the annular channels $n'$ is discharged against the outer wall of the cylinder for the purpose of cooling the latter, as well as to finely divide the fluid and thereby enable it to readily absorb moisture. The annular chamber 7 surrounding the engine cylinder and which contains the fluid discharging pipes just described, communicates with a portion of the water tank 10, as shown in Figs. 10 and 15, and in order to distribute the water from the tank 10 over the walls of the cylinder for cooling purposes, and also to insure a thorough mixing of the water and the fluid discharging from the pipes, it is preferable to mount the latter so as to revolve about the cylinder and on an axis coincident with the axis thereof, the rearwardly extending journal portions 75 carrying the pipes being fitted over the rearwardly projecting portions 71 fixed to the cylinder and which serve as a journal, a gland 64$^a$ serving to pack these parts and thereby prevent leakage, and on each side of the pipes $o$ are arranged pairs of oppositely opening troughs 11 which, while in the lowermost position, are submerged in the water from the tank 10 and are thereby filled, and while ascending the sides of the cylinder walls, due to the rotary movement of the pipes, they discharge the water contained therein and cause it to flow in a film over the walls of the cylinder, not only cooling the latter, but also facilitating the absorption of the heat by the fluid contained within the chamber 7. These pipes may be revolved in any suitable way, the journal portion 75 thereon being provided in the present instance with a gear 63 coöperating with a worm 65, the latter in turn being mounted on a shaft 66 which is driven by the beveled gears 67 and 68, the latter being mounted on an operating shaft 69 having a pair of bevel gears 70 and 70$^a$, respectively, on the opposite ends which coöperate with the gears 570 and 571 arranged on the countershafts 572 and 573, respectively, the power shaft $u$ being provided with a gear 574 which engages the gear 572 to operate the shaft 69, while the gear 573 engages a gear 575 mounted on a shaft 578 at the opposite end of each engine and serve to operate the admission of explosive gas to that end of the engine, it being understood that both ends of the latter are constructed similarly or, as shown in Fig. 4, and each is provided with a piston, and controlling devices therefor.

Any suitable mechanism may be employed for controlling the explosive charges of mixed air and gas, that shown in the present instance comprising a cam 50 mounted on each of the shafts $u$, as shown in Figs. 4 and 5, this cam being arranged to operate a roller 49 mounted on the outer end of the valve stem 48, the latter being returned to closed position automatically by means of the spring 51. This valve stem extends axially through the extension 71 which closes the end of the cylinder, and it is provided at its inner end with a head 47 having a conical surface 47$^a$ thereon arranged to coöperate with a corresponding surface on a bushing 46 which surrounds the valve stem in rear of the head thereon and provides a passage for the explosive fluid when the conical valve surfaces are moved out of engagement by means of the cam 50 and the coöperating roller 49. The supply of vapor and air to the valve head 47 is controlled by a piston valve 52 which surrounds the valve stem in rear of the head 47 and is fitted to operate axially within the sleeve 52$^a$, the latter being provided with a port 43$^a$ which the piston valve covers and uncovers during the reciprocatory movement of the valve stem, the port 43$^a$ communicating with the passage 43 in a vaporizing coil $x$ which is preferably arranged within the combustion chamber of the cylinder and adapted to be heated by the explosive gases therein for the purpose of vaporizing the fuel, the latter being supplied to the vaporizing coil by the passage 111, as shown in Fig. 4, and fuel is supplied to this passage by means of a pump that will be presently described. The piston valve 52 is also provided with one or more auxiliary passages 54 which are arranged outwardly beyond a conical valve surface 55$^a$, the latter being arranged to coöperate with a corresponding valve seat 55 arranged in rear of the piston valve, these valve surfaces serving to control the flow of air from the annular passage 56 at one side of the piston valve to the chamber 44 at the opposite side thereof. Air under pressure that is to be utilized to support the combustion within the cylinder, is supplied to the annular passage 56 through a pipe 58, as shown in Figs. 5 and 9, this pipe being provided with a controlling valve 57 having an operating arm 59 thereon provided with a pin and slot connection with an operating lever 60, the latter being pivoted on a relatively fixed portion of the cylinder and is connected by a link 61 to the valve stem 48, a pivot 62 serving to connect the parts. The air controlling valve 57 is employed for the purpose of cutting off the supply of air a moment before the engagement of the valve surfaces 55 and 55$^a$ adjacent to the piston valve.

The hydro-carbon or other fuel is supplied to the passage 111 under sufficient pressure to enter the cylinder while the latter is under compression by means of a pump shown in Figs. 47 to 49, the pump shown in the present instance comprising a cylinder $v$ having a plunger 106 arranged to be reciprocated therein by means of a connecting arm 107, the latter having a cross head 104 connected thereto by a crank pin 103, and the cross head is mounted to slide in guides 104$^a$ extending radially of an operating gear 100, the movement of the cross head longitudinally of the guides serving to vary the strokes of the plunger according to the different quantities of fuel required during the operation of the engine, the gear 100 being mounted on a pair of bearing arms 97 carried by a standard 98 by means of a ring shaped bearing 101, and the gear 100 is driven continuously by means of a coöperating gear 102 which is mounted on the power shaft $u$, as shown in Fig. 4. The fuel is admitted to the cylinder $v$ by a valve 108 in the bottom thereof, and it is discharged through a valve 109 which discharges into a pipe 110 which in turn communicates with the passage 111, a relief valve 111$^a$ being preferably provided for the purpose of preventing undue flow of fuel to the engine. The quantity of fuel supplied to the engine is controlled according to the speed thereof by means of a governor $z$ which is mounted on a spindle 95 arranged axially of the operating gear 100 and is connected to the latter at one end by means of a cross arm 99, the governor shown being of the well known centrifugal type and is connected by means of a bell crank 105 to a pin 103 arranged at the rear side of the cross head, as shown in Fig. 47, variations in the speed of the operating gear causing the balls on the governor to operate the bell crank and thereby shift the cross head into different positions in a direction radially of the operating gear and thereby varying the strokes of the plunger and consequently the amount of fuel pumped at each operation thereof.

Air under sufficient pressure to enter the combustion chamber of the engine while the latter is under compression, is supplied to the pipe 58, as shown in Figs. 5 and 9, by means of a pipe 161 which leads from a high pressure reservoir $g$, as shown in Figs. 1 and 2, and a sufficient supply of compressed air is maintained in this reservoir by means of a pair of high pressure air pumps or compressors 30 and 31, one being shown in the present instance for each engine, as shown in Fig. 1. Air for compression is supplied to these high pressure air pumps from the low pressure reservoir $a$ by means of the pipes 32, as shown in Fig. 1, the pipes 32 discharging in the inlet pipes 160 on the compressors and the latter pipes in turn lead to the inlet valves 158, as shown in Fig. 11, the discharge of air from the high pressure pump being controlled by the valves 159 through which the air at high pressure is delivered into the discharge pipe 161, the latter leading to the high pressure reservoir $g$. In the present instance the inlet and discharge pipes 161 and 160, respectively, are branched, as shown in Fig. 1, and each is provided with an independent valve.

The cylinder 31 of the air pump is surrounded by a jacket 148 which provides a cooling chamber 147 to receive fluid which serves to absorb the heat generated by the compression, the plunger $30^a$ being pivotally connected at 151 to a connecting rod 29 which is driven from a crank 152 on the power shaft $u$, as shown in Fig. 11, a stuffing box 156 being preferably employed for packing the plunger. The latter is provided in the present instance with an axial bore 150 which has an oil receiving opening at a point adjacent to the pivot pin 151, and the branched passages 154 at the inner end of the plunger communicate with the axial bore 150 and serve to distribute lubricating oil to the wall of the cylinders. The annular space 147 surrounding the pressure cylinder communicates with the water tank 10 by means of the passage $147^a$, as shown in Fig. 11, and the heated fluid is conducted from the chamber 147 by means of the pipes 149 which lead into the chambers 7 surrounding the engine cylinders, as shown in Figs. 1 and 2.

In order to clear the cylinders of the engine of burned or spent gases after each explosion, it is preferable to provide devices for supplying an air blast to the combustion chamber immediately after the exhaust valves have opened to exhaust the gases, a supply of air for this purpose being drawn from the low pressure tank $a$ by the pipes 130, as shown in Figs. 1 and 2, and these pipes lead to controlling valves, such as those shown in Figs. 6 and 7. These valves each embody a reciprocatory stem 138, operated within the portion 71 which closes the rear end of the cylinders and are provided at their outer ends with rollers 137 which coöperate with cams 133 carried by each of the power shafts $u$, these cams being provided with a pair of recesses 136 into either of which the operating stud 134 carried by a collar 135 fixed on the shaft $u$, engages, the engagement of the stud in either of the two recesses permitting the cam 133 to be adjusted according to the direction of rotation of the engine. The inner end of the valve stem 138, as shown in Figs. 6 and 7, is provided with a valve head 132 which coöperates with a corresponding valve seat formed in the rear wall of the combustion chamber of the cylinder, the valve heads shown in the present instance being curved, as shown in Fig. 19 in order that it may fit between the convolutions of the vaporizing coils $x$, a supplemental valve stem 145 being connected to the main valve stem 148 by a cross piece 146. The valve head is automatically seated by means of a spring 139. A supplemental valve 131 arranged in the supply pipe 130 serves to control the supply of air to the main valve 132, the supplemental valve being provided with an operating arm 144 having a pin and slot connection with the operating lever 142, the latter being pivoted at 143 to a relatively fixed part on the engine, and is connected by a link 141 with a bracket 140 arranged on the main valve stem, the parts being preferably so timed that the supplemental valve will close a moment before the main valve 132 is seated.

According to the present invention the exhaust valves $s$ of the engines may be operated either mechanically or pneumatically, the mechanically operating valve mechanism being shown in Figs. 24 and 50 to 58, inclusive, and comprising generally a pair of rock shafts 231 which are rotatably mounted within a non-rotatable sleeve 200 secured within the trunnion $r$ of the engine piston, and these shafts are provided at their inner ends with reduced portions 232 carrying cranks 233, the latter being operatively connected to the exhaust valve rods 19, the outer ends of the crank shafts projecting through a frame 224, as shown in Figs. 51 and 52, the outer ends of the crank shafts 231 being provided with cranks having pins 230 arranged to coöperate with the slotted ends of a pair of bell cranks 221 and 222, the latter being pivoted on the frame 224 at 223, the opposite ends of these bell cranks being provided with pins or rollers 219 and 220 which are arranged to follow a cam track 218 formed in the face of a disk 216 which is revolubly mounted on a journaled portion 217 formed on a crank 203. A pair of springs 226 are attached to the eyes 227 on a frame 224 and to those ends of the bell cranks which engage the pins 230 on the cranks of the operating shaft 231, and they serve to retain the rollers in engagement with the cam track. The crank 203 is supported on a pin 202 which extends loosely in the sleeve 200, as shown in Fig. 24 and is provided with shoulders at opposite ends to prevent axial movement thereof and the crank is operatively connected to the disk 216 by means of a projection 214 which is adapted to engage either end of a concentric slot or groove 215 formed in the disk, as shown in Fig. 53, the projection engaging one end of the slot when the engine is operating in one direction, and the opposite end thereof when the engine is operating in the reverse direction, so that the timing of the exhaust valves may be correct in either direction of rotation of the engine. Rotary motion is transmitted from the power shaft $u$ to the crank 203 by means of a connecting rod 206 which engages a bearing sleeve 205 held in position on the crank pin by means of a collar 204, as shown in Fig. 24, and the connecting rod is provided with a bearing 211 which coöperates with a driving crank 212 on the power shaft. The relative strokes of the crank 212 and the crank 208 which is directly connected with the engine piston, are in such proportion to the stroke of the crank 203, that the latter will rotate once about its axis for each revolution of the power shaft $u$, as illustrated in the diagrams, Figs. 54 to 57, and each revolution of the disk 216 will cause rocking movements of the bell cranks 221 and 222, which movements are in turn transmitted to the crank pins 230 on the rock shaft 231, and the cranks 233 at the inner ends of the latter will be rocked to open the exhaust valves at the proper moments to permit the escape of the exhaust gases.

The pneumatic valve operating mechanism for the exhaust valves is illustrated in Figs. 23, 25, 26 and 27, and 41 to 46, inclusive, and it embodies generally a pair of telescopically arranged cylindrical valves 162 and 163 which are mounted axially of the trunnion $r$ of the cylinder piston, the valves being supplied with air under pressure through a port 164, an exhaust port 165 in the opposite ends of the valves serving to discharge air therefrom. These valves are also provided with ports 166 and 167 which communicate, respectively, with the pistons 168 and 169, one of these pistons being provided for each exhaust valve and they are mounted to operate in the cylinders 170 and 171, the outer ends of the piston rods being operatively connected to a pair of cranks 172 and 173, which in turn are connected to the respective valve stems 19 of the exhaust valves. The inner cylinder valve 162, as shown in Figs. 25 and 41, is rotated by the arms 174, and the latter are slotted to receive the trunnions 185 carried by an operating frame 184, the latter having a piston rod 183 which extends through an operating cylinder 176 and is provided with a piston head 175. The cylinder 176 is supplied with air from the low pressure reservoir $a$, this air supply being controlled by the valve 163, and the latter is operated by the relative motion of a telescopic arm 177, the angular position of which varies during the reciprocatory strokes of the engine piston, and consequently causing the valves 162 and 163 to rock alternately in opposite directions.

In Figs. 41 and 42, the valves 162 and 163 are to the left-hand side of the fixed center 178 above which the telescopic arm 177 oscillates, the latter being inclined upwardly to the left. In this position the air passes from the valve 162 through the port 166 into the passage 179, the latter leading to a valve chamber 180 within which the stem of a valve 181 operates, the valve at the left-hand underside in Fig. 42 being shown seated, while that of the opposite side of the figure is unseated to control the discharge or exhaust of air from the cylinder 176 through the openings 188, springs 182 coöperating with buttons 187 on the respective valves and normally operating to move to unseat them and thereby permit the air within the cylinder to exhaust. While the flow of air through the left-hand passage 179 is permitted by the opening of the port in the valve 162, the corresponding right hand passage 179 is closed by a solid portion of the said valve, and in order to further control the flow of air to the opposite sides of the piston 175, it is preferable to interpose a pair of stop valves 189 and 191 which control the passage of air through the respective passages 179. These stop valves are provided with operating arms 190 and 192, respectively, which are connected for simultaneous movement by a frame 193, as shown in Figs. 45 and 46, one of the valves being in open position while the other is in closed position. This frame is provided with suitably spaced stops 194 and 194$^a$, with which a portion of the telescopic arm 177 engages as the engine piston reciprocates in opposite directions, the frame being moved in one direction to open one of the stop valves and close the other, and then in a reverse direction to reverse the arrangement of the stop valves, the latter being yieldably retained in each position by means of spring catches, 195.

When air is admitted to the left-hand side of the piston 175, as shown in Fig. 42, this piston will reciprocate toward the right carrying with it the arms 174, as shown in Figs. 43 and 44, the position of the valve 162 being reversed so as to close the left-hand passage 179 and to open the corresponding right-hand passage, and when the engine piston reaches a reverse position, the angular position of the telescopic arm 177 will be such as to rotate the valve 163 into position to open the right-hand passage 179 and thus admit air to the right-hand side of the piston 175 preparatory to its return stroke. It is preferable to provide a latch 197 which is pivoted to a relatively fixed part of the machine at 198, and has a portion to engage with one of the reversely arranged notches 196 in the valve operating arm 174, the latter being automatically disengaged from the notch to permit movement of the valve operating arm by means of a pin 199 which is carried by the button 187 on the valve 181 and moves downwardly when the latter is operated by the pressure of air above it.

The discharging ports at the inner ends of the two cylinder valves, as shown in Figs. 23 and 25, are arranged to register alternately with the passages 166ª and 167ª formed in the relatively fixed casing and leading to the respective cylinders 170 and 171 so that when these valves are rotated into one position, due to a stroke of the engine piston, air under pressure will be admitted to one of these cylinders to operate its respective exhaust valve, and on the reverse stroke the air admitted to the said cylinder will be exhausted through the passage 171ª and the registering ports 171ᵇ in the valves to the exhaust 165, and at the same time air under pressure will be admitted to the other cylinder causing it to open its respective exhaust valve. As each exhaust valve opens it will discharge the burned gases and also the air admitted through the valve 132 for the purpose of clearing the cylinder.

The exhaust gases, as previously stated, are discharged into the conduit 422 surrounding the arm 419 on the engine piston, as shown in Figs. 10 and 15, and this conduit is submerged below the water in the tank 10 and surrounds the pipe 123 through which the motive fluid for the turbine is conducted as shown in Fig. 28, and the exhaust products are conducted from the conduit into sets of cooling pipes 308 and 309, which serve to extract the heat from the spent gases, and thereby raise the temperature of the water in the tank so as to facilitate its vaporization when used as part of the motive fluid for driving the turbine. The coils of cooling pipes 308 and 309 lead into a common discharge pipe 310 which is provided with numerous perforations that will permit the exhaust gases to be discharged freely into a compartment 311, from which the gases finally issue through a spout or nozzle 327.

Water is supplied to the tank 10 from a reservoir having a filler 268 Figs. 37 and 38, at the top thereof, and a valve 269 for permitting a supply of water to be added to the tank and to enable the tank to be closed in order that a pressure may be maintained therein. It is preferable to provide automatic valves for maintaining the water at a constant level within the tank 10, a pair of valves 273 and 274 being shown in the present instance having operating levers 377 connected by a link 270ª which insures their simultaneous movement, the upper valve 273 serving to admit air from the chamber 271 which is supplied by the pipes $n$, while the lower valve 274 serves to admit water from the receptacle $q$ into the chamber 271. The valve arm or lever 377 is connected to a plunger on a float 275, the connection of the parts being such that a rise of liquid in the chamber 271 will cause the upper and lower valves to be closed, and a fall of the liquid in the said chamber will cause both valves to be opened, the upper valve admitting the air under pressure into the reservoir $q$, and the lower valve will permit liquid from the said reservoir to flow into the chamber 271, the latter chamber being connected to the tank 10 by means of a conduit 311ª. If so desired, the stem of one of the valves may be provided with a handle 276 which is arranged exterior to the chamber 271, and it serves to permit these valves to be operated independently of the float, and thus enable the tank 10 and the chambers surrounding the compressor and engine cylinders to be flooded when so desired.

The turbine which constitutes the supplemental motor in the present instance, and which utilizes the fuel which is progressively expanded by the heat absorbed from the compressor and engine cylinders, and the heat radiated from the exhaust pipe in the presence of the liquid of the chamber 10, is composed of an annular casing arranged concentrically of the shaft $t$, and it contains a runner or a revoluble element $f$ which is provided with peripheral buckets or fluid receiving recesses 124 which operate in a central annular chamber of the turbine casing, and the latter is provided with exhaust chambers 128 which are separated from the chamber in which the runner operates, as shown in Figs. 1, 28, and 29 and 30. Suitably spaced around the casing are two sets of valves 125 and 126, the valves 125 each having a substantially tangential fluid passage or nozzle which extend in one direction relative to the rotation of the runner, and the valves 126 are provided with a similar set of discharge openings or nozzles which extend in a relatively reverse direction so that when one set of valves is open the turbine will rotate in one direction under the influence of the fluid discharged therefrom, and in a reverse direction when the other set of valves are opened. Between the valves of each set are arranged exhaust valves 127 through which the fluid from the adjacent corresponding valve is discharged after it has impinged against the runner, these exhaust openings communicating with the peripheral chambers 128 which extend around the turbine casing and discharge into a refrigerating chamber 112, as shown in Fig. 30, the motive fluid being conducted to a circular channel 123 by means of the pipe 251. In order to effect a simultaneous setting of the valves of each set, they are preferably connected by links 260 which are pivotally connected to operating levers arranged on the respective valves so that all of the latter will be turned so that one set is closed while the other is opened, and vice versa. The setting of the valves is accomplished by a lever 258 which is preferably provided with a notched sector 259 by means of which the valves may be retained in any adjusted position. It is also preferable to provide an automatic brake for stopping the turbine when both sets of valves are shut off, that is to say, when the operating lever 258 occupies a neutral position, a mechanism of this kind being shown in Figs. 30 and 32, and comprising a pair of fluid pressure cylinders 119 mounted on a relatively fixed portion of the base and having a piston 120 therein operatively connected to one end of a brake band 116, the latter coöperating with a brake wheel 115 fixed to the turbine shaft at each side of the turbine. The cylinder is provided with upper and lower air inlets 121 and 122 which enter the cylinder at opposite sides of the piston, and these inlets receive air from two separate pipes 253 and 254, and the flow of air to these pipes is controlled by a valve 252, shown in Fig. 30, having a passage therein which receives air from the pipe 251 and discharges it into one or the other of the pipes according to its position, a circumferential groove 262 communicating with the pipe 253 and serving to conduct the air thereto. This valve which controls the brakes is preferably operated by the same lever which sets the valves controlling the supply of fluid to the turbine, it being provided with a crank 255 which is operatively connected by the link 256 to the arm 257 on one of the valves 125 so that when the operating lever for the valve occupies a neutral position, air will enter the inlet 121 and thereby set the brake band against the brake wheel, and when it is moved to a position that will open the motive fluid valves of either set, the valve 252 will be turned so as to admit air through the lower inlet 122 to the brake cylinder, thereby forcing the piston thereof upwardly and releasing the brake band. The exhaust air from each side of the piston of the brake cylinder is discharged automatically by means of a pair of valves 265 which are operatively connected for simultaneous movement by a pair of levers 267 and a link connecting them, one of the valves being in open position to exhaust the air from that side of the piston when the other valve is seated by air entering at that side of the piston.

The fluid from the turbine, as previously stated, is discharged into a refrigerating chamber 112 wherein is located a condensing medium 129 which may be composed of wire-work or perforated metal that will afford a relatively large surface through which the moisture laden fluid from the turbine passes, the condensing medium serving to liquefy the vapor or moisture contained in the fluid, and this moisture falls to the bottom of the chamber 112 and passes through the drip openings 388, the latter in turn discharging into a draining receptacle 389, and the liquid collected in the draining receptacle 389 may be returned to the liquid reservoir $q$ by a pipe connection 390, as shown in Fig. 33$^a$. The exhaust fluid flows from the refrigerating chamber 112 into a space surrounding the high pressure air reservoir $g$, as shown in Fig. 31; thence around the intermediate chamber 39 and finally it flows through the space formed between the low pressure reservoir $a$ and its inclosing shell $a'$, a part of the motive fluid thus exhausted being recompressed by entering the inlet pipes 114 of the low pressure compressor.

In order to prevent undue pressure within the reservoir $a$, it is preferably provided with a main safety valve 40, as shown in Fig. 31, and a supplemental safety valve 40$^a$ which delivers into a chamber 39 through the passage 34, The high pressure reservoir $g$ is provided with a similar safety valve 36 which also delivers into the chamber 39 through a passage 33. The condensation water is discharged through the drip cocks 41 and 42 in the respective reservoirs.

In order to prevent escape of air through the cylinder clearing devices, while the engine is not in operation, it is preferable to provide the pipes 130 which supply air thereto from the low pressure reservoir with valves 306 and 307 having operating arms 302 and 304 connected for simultaneous movement by a link 303, a second arm 300 on the valve 306 being connected by a pin and slot connection with a bell crank lever 299 which in turn is connected by a link 298 to a second bell crank lever 297 mounted on a relatively fixed part of the turbine casing, and this bell crank lever is connected by a link 296 to a lever 291 pivoted at one side of the sector for the valve operating lever 258, and it is provided with a projection 290 which is arranged to be engaged by a roller or projection 289 on the valve operating lever so that when the latter moves into a neutral position, it will tilt the lever 291 to either side, as shown in Fig. 61, thereby holding the cut-off valves 306 and 307 in closed positions. A spring 295 connected to the lever 291 and to a relatively stationary arm 294, serves to return the arm 291 to central position, at which time the valves 306 and 307 will be in opened position.

The engine may be started initially by supplying air under pressure to the tank $a$, and thence conducting the air from this tank through the pipes $h$ into the passages $i$ in the trunnions of the low pressure air compressor, the air thence flowing longitudinally through the passages $k$ in the compressor piston, as shown in Fig. 35; thence into the return passages 1, as shown in Fig. 35 through the discharge openings 4 and 5 in the piston and cylinder walls, respectively, and into the chamber $p$ surrounding the compressor cylinder, and from the latter chamber, the air is discharged through the pipes $n$, as shown in Fig. 35 into the jackets surrounding the several engine cylinders, as shown in Figs. 1, 2, 4 and 10, the fluid being conducted by way of the annular channel $n'$ into the annular set of perforated discharge pipes $o$, the fluid being discharged through the orifices 6 in these pipes and against the cylinder walls while the latter are covered by a film of water scooped up from the tanks 10 by the troughs 11, as shown in Figs. 15 and 16. The fluid is conducted from the several cylinder jackets by the tubes 13 which have a sliding connection, as previously described with the enlarged portions 12 of the respective cylinder casings, and it is discharged from these tubes into the passages 15 of the trunnions $r$ of each piston, as shown in Fig. 23, and thence into the outer annular chamber 16 of the piston, as shown in Figs. 23 and 24. From the outer chamber 16 the fluid is conducted by the radial passages 24, as shown in Fig. 17, to the central inner chamber 18, as shown in Fig. 10, and from the latter it is conducted by the tubular extension 423 into the inlet pipe 251 of the turbine, the latter discharging into a channel 123 which supplies the sets of inlet valves 125 and 126, the fluid discharging through the nozzles leading from one set of valves and impinging against the runner of the turbine, thereby causing rotation of the shaft $t$ on which the runner is mounted. The shaft $t$ is operatively connected to the power shaft $u$ of both engines by means of the pinions 25 and the coöperating gears 26, the ratio of gearing being such that the explosive engines and the turbine will operate at the proper relative speeds to insure the maximum efficiency.

From the runner chamber of the turbine the fluid discharges through the exhaust ports 127 into the annular exhaust channels 128 surrounding the turbine casing, and these channels discharge into the refrigerating chamber 112, as shown in Fig. 30, the latter discharging into the space between the low pressure reservoir $a$ and its inclosing shell $a'$, as shown in Fig. 31. The motion thus imparted to the power shafts of the two engines will serve to turn them over and enable them to start. However, during the regular operation of the engine, the motive fluid which serves to drive the turbine is progressively heated from the time it leaves the low pressure reservoir until it reaches the turbine, it expanding many times its original volume, and thereby amplifying its energy, and at the same time the heat utilized to expand the motive fluid of the turbine is abstracted from the working parts of the engine so that the heat generated that would otherwise be wasted, is transformed into mechanical energy.

The first step in the progressive heating of the motive fluid occurs in the low pressure air compressor, the air first entering the passages of the piston through the hollow trunnions and thence encircling the jacket surrounding the compressor cylinder, and from the latter it is conducted to the jackets surrounding the cylinders wherein the explosions which propel the engine pistons, occur. In these jackets the air is discharged from numerous perforations in an annular row of pipes which revolve about the combustion chamber, and are equipped with other devices which insure the presence of a film of water on the exterior wall of the cylinder, and against which the streams of air are directed, the air presenting a relatively large contact surface which will absorb a considerable portion of the water, and the evaporization process will also serve to increase the cooling effect of the liquid upon the engine cylinder. From these jackets surrounding the engine cylinders, the fluid is conducted by the tubes 13 into the outer and inner chambers 16 and 18, respectively, of the engine piston, the exhaust gases from the combustion chamber of the engine discharging through a passage 20 which is arranged between the chambers in which the motive fluid is confined, and these highly heated gases will further increase the temperature of the fluid. The fluid is next conducted through the tubular extension 423 which is wholly surrounded by the escaping exhaust gases, and the motive fluid is heated to a maximum temperature just before it is discharged into the turbine through the supply pipe 251, and the exhaust gases are reduced to approximately a normal temperature by leading them from the conduit or superheating channels surrounding the fluid supply pipes, through the coils of cooling pipes 308 and 309 which are submerged in the liquid contained in the tank 10, and the heat thus absorbed by the water is utilized to bring the water approximately to the vaporizing point in order that it may be readily taken up by the motive fluid as the latter passes through the jackets of the compressor and engine cylinders.

What I claim is:—

1. An apparatus of the character described comprising an internal combustion engine constituting a primary motor and having a heat absorbing chamber surrounding its cylinder, and a similar chamber in its piston communicating therewith, an air compressor driven from the primary motor and connected to supply a compressed fluid to the said heat absorbing chamber of said cylinder, thence to the said chamber in its piston, an auxiliary motor connected to receive said fluid after circulating through the said heat absorbing chamber of said piston of the primary motor and to utilize such fluid, and a cooling device connected to receive said fluid after being utilized in said auxiliary motor and adapted to cool it and to supply such cooled fluid to the compressor for recompression.

2. An apparatus of the character described comprising an internal combustion engine constituting a primary motor and having a heat absorbing chamber surrounding its cylinder and also provided with a similar chamber in its piston, a storage tank, an air compressor driven from the primary motor and adapted to conduct compressed fluid therefrom to the said storage tank, means for conducting said fluid from the storage tank to the heat absorbing chamber surrounding the cylinder of the internal combustion engine, means for conducting such fluid from the heat absorbing chamber surrounding said cylinder to the heat absorbing chamber of said piston, a turbine connected to receive such fluid after passing through the heat absorbing chamber of said piston, the turbine serving to utilize such fluid, and a cooling device connected to receive the fluid after being utilized in the turbine, the cooling device serving to refrigerate such fluid and to conduct it to said compressor for recompression.

3. In an engine, the combination of an internal combustion engine having a cylinder provided with a surrounding chamber, and a liquid tank communicating with the lower portion of the said chamber, of a source of fluid pressure supply having means for conducting the fluid to the said chamber wherein it absorbs heat from the engine cylinder in the presence of the liquid in the tank, and a motor auxiliary to the primary motor for utilizing the resultant expanded fluid.

4. In an engine, the combination of an internal combustion engine having a cylinder provided with a surrounding chamber, a liquid tank communicating with the lower portion of the said chamber, and a set of fluid discharging pipes mounted to revolve about the cylinder and having troughs thereon for elevating liquid from the tank at the lower portion of the surrounding chamber pouring it over the surface of the cylinder, of a source of fluid pressure supply communicating with the said discharge pipes, an auxiliary motor, and means for conducting fluid from the chamber surrounding the cylinder to the auxiliary motor.

5. In a device of the character described, the combination with an internal combustion engine having a cylinder, a jacket surrounding it and forming a chamber, a water tank communicating with the lower portion of the said chamber, and a set of fluid discharge pipes having a series of orifices directed to the cylinder and revoluble about the latter, and troughs movable with the pipes for elevating liquid from the tank and discharging it upon the cylinder, of an auxiliary motor, means for conducting the fluid from the chamber surrounding said cylinder to the motor, and automatically controlled valves for maintaining the liquid at a predetermined level relative to the engine cylinder.

6. In a device of the character described, the combination with an internal combustion engine, and an air compressor having cooling chambers within the piston and surrounding the cylinder thereof and a tank connected to receive compressed fluid from the compressor, of means for conducting air from the tank through the heat absorbing chambers within the cylinder and piston of the compressor, thence to the internal combustion engine for the purpose of absorbing heat generated by the explosions therein, and an auxiliary motor connected to receive the fluid after it has traversed the compressor and internal combustion engine.

7. In a device of the class described, the combination with an internal combustion engine having heat absorbing chambers formed about the cylinder within the piston thereof, an air compressor having similar heat absorbing chambers in its cylinder and piston, and a storage tank to receive the compressed air, of means for conducting the air from the said tank through the heat absorbing chambers within the cylinder and piston of said compressor, and thence to the heat absorbing chambers in the cylinder and piston of the internal combustion engine for progressively expanding the air, and an auxiliary motor utilizing the expanded motive fluid thus produced.

8. In a device of the character described, the combination with an internal combustion engine having a cylinder provided with surrounding heat absorbing chambers and having a piston provided with heat absorbing chambers communicating with that of the cylinder, a fluid discharge pipe leading from the piston and arranged within the exhaust passage of the engine, an air compressor having heat absorbing chambers within its piston and cylinder and in communication with one another, and a storage tank connected to receive fluid from the compressor of means for conducting air compressed by the compressor into said tank, thence to the heat absorbing chambers in the piston of the latter, thence into the heat absorbing chambers in its cylinder, thence to the heat absorbing chamber in the cylinder of the internal combustion engine, thence to the heat absorbing chambers in the piston of the said engine, and thence to the fluid discharge pipe whereby the air is progressively expanded, and an auxiliary motor connected to receive the expanded air from the fluid discharge.

9. In a device of the character described, the combination with an internal combustion engine embodying cylinders and reciprocatory pistons operating therein, and a power shaft connected to the pistons, of a turbine having a revoluble element operatively connected to the power shaft of the internal combustion engine and serving as a flywheel therefor, means for conducting compressed fluid from a storage tank to the turbine for starting the internal combustion engine, said fluid absorbing heat from the internal combustion engine and being thus expanded during the operation thereof.

10. In a device of the character described, the combination with a base having a water tank formed therein, of an internal combustion engine having cylinders provided with surrounding cooling chambers communicating with the water tank, and an air compressor having a cylinder provided with a cooling chamber also communicating with the said tank, and a storage reservoir, of means for conducting air from the compressor to the storage reservoir and from the latter cooling chamber surrounding the cylinder of the compressor, thence to the cooling chamber surrounding the cylinder of the internal combustion engine, and a motor connected to receive fluid from the chamber of the internal combustion engine.

11. In a device of the character described, the combination with a base having a water tank formed therein, an internal combustion engine having a cylinder provided with a surrounding cooling chamber communicating with the water tank, an air compressor having a cylinder provided with a cooling chamber also communicating with the said tank, a storage reservoir connected to receive fluid from the compressor and a heating coil submerged in the water of the said tank and connected to receive the exhaust gases from the internal combustion engine, of means for conducting air from the compressor to the storage reservoir and thence to the chamber surrounding the cylinder of the compressor and thence to the cooling chamber surrounding the cylinder of the internal combustion engine, and an auxiliary motor utilizing the heated and expanded fluid thus produced.

12. In a device of the character described, the combination of a base, an air tank mounted thereon, a shell inclosing the said tank and providing an annular passage surrounding it, a compressor for supplying air to the tank and having inlet pipes communicating with the space surrounding the tank, and a turbine connected to receive and utilize the air from the said tank as a motive fluid, of a refrigerating chamber connected to receive the exhaust fluid from the turbine, and discharging into the space surrounding the said tank.

13. In a device of the character described, the combination with a base having a water tank formed therein, an internal combustion engine having a cylinder provided with a surrounding cooling chamber communicating with the said tank, an air compressor having a cylinder provided with a cooling chamber also communicating with the said tank, an air tank connected to receive fluid from the compressor, and a shell inclosing the air tank and forming an annular passage around the latter, of means for conducting air from the air tank to the cooling chamber of the compressor, thence to the cooling chamber of the engine cylinder, an auxiliary motor connected to receive the fluid from the engine cylinder, and a refrigerating chamber connected to receive the exhausted fluid from the auxiliary motor and discharging into the passage surrounding the air tank, and means within the refrigerating chamber for condensing the moisture contained in the fluid discharged from the auxiliary motor.

14. The combination with an internal combustion engine embodying a cylinder, a piston mounted to reciprocate therein, and a power shaft, of a turbine having a revoluble element geared to the power shaft, valves controlling admission of fluid to the turbine, a brake for the turbine, and devices controlled by the inlet valves of the turbine for setting the brake when the valves are in closed position.

In testimony whereof I have hereunto set my hand in presence of two subscribing witnesses.

JOHN HUTCHINGS.

Witnesses:
JOHN COODE HARE,
HARRY JOHN STOGDEN.